(12) United States Patent
Furuta

(10) Patent No.: US 9,481,268 B2
(45) Date of Patent: Nov. 1, 2016

(54) VEHICLE SEAT

(71) Applicant: TS TECH CO., LTD., Asaka-shi, Saitama (JP)

(72) Inventor: Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/427,476

(22) PCT Filed: Sep. 12, 2013

(86) PCT No.: PCT/JP2013/074612
§ 371 (c)(1),
(2) Date: Mar. 11, 2015

(87) PCT Pub. No.: WO2014/042204
PCT Pub. Date: Mar. 20, 2014

(65) Prior Publication Data
US 2015/0246624 A1    Sep. 3, 2015

(30) Foreign Application Priority Data

Sep. 13, 2012  (JP) ................................. 2012-201221

(51) Int. Cl.
*A47C 1/025* (2006.01)
*A47C 7/02* (2006.01)
(Continued)

(52) U.S. Cl.
CPC .................. *B60N 2/22* (2013.01); *B29C 65/48* (2013.01); *B29C 65/7814* (2013.01);
(Continued)

(58) Field of Classification Search
CPC ........ B60N 2/72; B60N 2/64; B60N 2/1615; B60N 2/682; B60N 2/165; B60N 2/22
USPC ............ 297/344.15, 344.16, 344.17, 452.18, 297/452.2; 156/290, 291, 292, 295, 298; 428/192, 194, 198, 66.4; 277/593, 639
See application file for complete search history.

(56) References Cited

U.S. PATENT DOCUMENTS 4,576,670 A * 3/1986 Schade .................... H01L 24/33
156/295 X
4,731,920 A * 3/1988 Nishijima .............. G11B 5/105
156/292

(Continued)

FOREIGN PATENT DOCUMENTS

JP    2007-220916 A    8/2007
JP    2008-273053 A    11/2008

(Continued)

OTHER PUBLICATIONS

Office Action issued in related application JP 2012-201221, Jun. 28, 2016, with machine generated English language translation, 4 pages.

*Primary Examiner* — Rodney B White
(74) *Attorney, Agent, or Firm* — Drinker Biddle & Reath LLP

(57) ABSTRACT

A vehicle seat has a first member and a second member bonded to each other with an adhesive agent is provided with a projecting portion that projects from an adhering surface of the first member toward the second member with one end to the other end in a protruding direction of the projecting parts held on the inner side of an outer edge of the adhering surface. An adhesive agent layer formed by the adhesive agent interposed between the first member and the second member surrounds the projecting portion while in contact with the outer circumferential surface of the projecting portion.

7 Claims, 20 Drawing Sheets

(51) Int. Cl.
   *B60N 2/22* (2006.01)
   *B29C 65/48* (2006.01)
   *B29C 65/78* (2006.01)
   *B60N 2/68* (2006.01)
   *B60N 2/16* (2006.01)
   *B60N 2/64* (2006.01)
   *B60N 2/72* (2006.01)
   *B29C 65/56* (2006.01)
   *B29C 65/00* (2006.01)
   *B29L 31/00* (2006.01)
   *B29L 31/30* (2006.01)
   *B29C 65/52* (2006.01)

(52) U.S. Cl.
   CPC ........ *B29C 65/7829* (2013.01); *B29C 66/131* (2013.01); *B29C 66/474* (2013.01); *B29C 66/5344* (2013.01); *B29C 66/5346* (2013.01); *B29C 66/7212* (2013.01); *B60N 2/165* (2013.01); *B60N 2/1615* (2013.01); *B60N 2/64* (2013.01); *B60N 2/682* (2013.01); *B60N 2/72* (2013.01); *B29C 65/483* (2013.01); *B29C 65/52* (2013.01); *B29C 65/56* (2013.01); *B29C 66/1222* (2013.01); *B29C 66/1224* (2013.01); *B29C 66/14* (2013.01); *B29L 2031/30* (2013.01); *B29L 2031/3055* (2013.01); *B29L 2031/737* (2013.01); *B29L 2031/771* (2013.01)

(56) References Cited

U.S. PATENT DOCUMENTS

| | | | | |
|---|---|---|---|---|
| 5,643,654 A * | 7/1997 | Fujita | ............... | G03F 1/62 428/192 X |
| 5,913,567 A * | 6/1999 | Novak | ............... | B60N 2/242 297/452.18 X |
| 6,176,543 B1 * | 1/2001 | Nawata | ............... | B60N 2/1615 296/187.11 |
| 6,220,669 B1 * | 4/2001 | Frohnhaus | ............... | B60N 2/1615 297/452.18 X |
| 6,263,939 B1 * | 7/2001 | Miyamoto | ............... | B29C 45/263 156/295 X |
| 6,653,742 B1 * | 11/2003 | Lin | ............... | H01L 24/11 156/292 |
| 6,667,229 B1 * | 12/2003 | Lin | ............... | H01L 24/11 156/292 |
| 7,097,742 B2 * | 8/2006 | Furuse | ............... | B60J 5/0405 296/146.6 |
| RE39,412 E * | 11/2006 | Miyamoto | ............... | B29C 65/521 156/295 X |
| 7,543,890 B1 * | 6/2009 | Sasaki | ............... | B60N 2/206 297/378.1 |
| 8,172,326 B2 * | 5/2012 | Adragna | ............... | B60N 2/1615 297/344.15 |
| 8,628,144 B2 * | 1/2014 | Moegling | ............... | B60R 22/22 297/452.18 X |
| 8,894,152 B2 * | 11/2014 | Lorey | ............... | B60N 2/502 297/344.16 X |
| 8,932,418 B2 * | 1/2015 | Jendrny | ............... | B21J 15/02 156/292 X |
| 9,126,518 B2 * | 9/2015 | Adragna | ............... | B60N 2/1615 |
| 2003/0062759 A1 * | 4/2003 | Gupta | ............... | B60N 2/3013 297/452.65 |
| 2004/0227389 A1 * | 11/2004 | Yoshida | ............... | B60N 2/64 297/452.18 |
| 2011/0133538 A1 * | 6/2011 | Adragna | ............... | B60N 2/1615 297/452.18 |
| 2011/0169317 A1 * | 7/2011 | Fujita | ............... | A47C 7/02 297/452.18 X |
| 2011/0278892 A1 * | 11/2011 | Kroener | ............... | B23K 20/122 297/452.18 X |
| 2012/0169107 A1 * | 7/2012 | Sakkinen | ............... | B23K 26/32 297/452.18 |
| 2013/0069415 A1 * | 3/2013 | Yasuda | ............... | B60N 2/682 297/452.18 |
| 2015/0224901 A1 * | 8/2015 | Furuta | ............... | B60N 2/68 297/452.18 |
| 2016/0039175 A1 * | 2/2016 | Colino Vega | ............... | E04G 19/00 428/192 X |

FOREIGN PATENT DOCUMENTS

| | | |
|---|---|---|
| JP | 2009-014417 A | 1/2009 |
| JP | 2009-286237 A | 12/2009 |
| JP | 2011-500448 A | 1/2011 |
| WO | WO 2010/124006 A1 | 10/2010 |

* cited by examiner

VEHICLE SEAT

CROSS REFERENCE TO RELATED APPLICATIONS

This application is a National Stage Entry application of PCT Application No. PCT/JP2013/074612, filed Sep. 12, 2013, which claims the foreign priority benefit of Japanese Patent Application No. 2012-201221, filed Sep. 13, 2012, the entire contents of which are incorporated herein by reference.

BACKGROUND

Disclosed herein is a vehicle seat, and in particular, a vehicle seat that has a first member and a second member bonded to each other with an adhesive agent.

When a vehicle seat is assembled, there are cases where components of this vehicle seat are bonded to each other with an adhesive agent. Especially when seat components are resin molded products that cannot be bonded to each other with welding, a bonding method using an adhesive agent is employed.

In some configurations in which components are bonded to each other with an adhesive agent, a projecting portion is formed to protrude from the adhering surface of a component (i.e., the surface of a component which faces another component) toward another component (e.g., refer to Japanese Patent Document No. 2008-273053 A ("the '053 Document")).

To give a more specific description of the bonding method described in the '053 Document, when components are placed close to each other at an adhering step, a projecting portion of a component is abutted against an adhesive agent layer coated on the other component in the direction from a tip end thereof. Then, the layered adhesive agent is pressed and widened by the projecting portion, thereby spreading out over a wide area. As a result, this enables the components to adhere well to each other while suppressing air from being trapped in the adhesive agent layer, or so-called voids from being generated therein.

In particular, according to the bonding method described in the '053 Document, the projecting portion is formed in the component such that it linearly and continuously extends from one end of the bonded surface of the component to the other end. Thus, when the components to be mutually bonded are placed close to each other and the above projecting portion is pressed against the adhesive agent, the adhesive agent is widened on the sides of the projecting portion and along the continuously extending direction of the projecting portion. As a result, the bonding method described in the '053 Document enables the components to adhere to each other in good condition without the need to apply an adhesive agent at multiple sites on the adhering surface of the component to which the adhesive agent is to be applied.

However, according to the bonding method described in the '053 Document, as described above, the projecting portion is continuously formed from one end to the other end of the bonded surface of the component, which is provided with the projecting portion. In this configuration, it is difficult to suppress the adhesive agent from being deformed and sticking out from the edges in a direction along which the projecting portion is continuously formed. Therefore, for example, if a load is input along the above continuing direction, the bonded components may be separated from each other.

For example, if a first member and a second member can be fitted to each other, an adhesive agent layer is formed between the first and second members around their fitting parts. In this configuration, it is necessary to stabilize the bonding state of both members so that their fitting state is maintained in good condition. In addition, it is necessary to further improve a bonding strength at which the first member adheres to the second member and a fitting strength at which one of the members fits into the other member.

Moreover, if the first member and the second member are fittable to each other, it is necessary to configure the first and second members such that one of these does not rotate relative to the other while maintaining their stiffness.

If the above projecting portion extends on the bonded surface in a predetermined direction, when a load is placed in a direction perpendicular to the longitudinal direction of the projecting portion, the bonded members are, in many cases, released from the bonding state. In this case, they may be separated easily from each other. For this reason, if a projecting portion is formed to extend in a predetermined direction, it is necessary to further improve a strength at which both members adhere to each other.

SUMMARY

Accordingly, various embodiments of the present invention have been made in view of the foregoing problems, and an object of them is to provide a vehicle seat that has a configuration in which a projecting portion protrudes from an adhering surface of a first member toward a second member in order to adhere the first member to the second member with an adhesive agent. If a load is input in any given direction, this vehicle seat is still capable of maintaining a stable state where the first member is bonded to the second members by suppressing a deformation of the adhesive agent.

Another object is to: when a first member and a second member constitute a fitting structure, stabilize a bonding state of both members so that their fitting state can be maintained in good condition; and further improve a bonding strength at which the first member adheres to the second member and a fitting strength at which one of the members fits into the other member.

A further another object is to, when a first member and a second member constitute a fitting structure, provide a configuration in which one of the members does not rotate relative to the other member while maintaining their stiffness.

A still another object is to, when a projecting portion that extends in a predetermined direction is formed, further improve a strength at which a first member adheres to a second member.

A vehicle seat as described herein has overcome problems as described above. This vehicle seat includes: a first member; and a second member bonded to the first member with an adhesive agent. A projecting portion that protrudes from an adhering surface of the first member toward the second member is formed with one end to the other end in a protruding direction of the projecting portion held on an inner side of an outer edge of the adhering surface. An adhesive agent layer formed of the adhesive agent interposed between the first member and the second member makes contact with an outer circumferential surface of the projecting portion while surrounding the projecting portion.

According to the vehicle seat configured above, the projecting portion that protrudes from the adhering surface of the first member toward the second member is formed with one end to the other end in the protruding direction of the projecting portion held on the inner side of the outer edge of the adhering surface. Thus, as opposed to a case where a portion of a projecting portion sticks out from the outer edge of an adhering surface, the adhesive agent can be suppressed from being deformed and sticking out outward from the adhering surface through this portion. Furthermore, since the adhesive agent layer formed of the adhesive agent makes contact with the outer circumferential surface of the projecting portion while surrounding the projecting portion, the adhesive agent is suppressed from being deformed in all directions by the projecting portion. Because of these effects, the vehicle seat configured above can stabilize the state where the first member is bonded to the second member, preventing the mutually bonded members from being separated from each other.

In the vehicle seat described above, the projecting portion may include a plurality of projecting parts formed on the adhering surface. The first member may have a second projecting portion that protrudes from a portion of the adhering surface which is between the plurality of projecting parts. The second member may have a fitting hole into which the second projecting portion fits.

According to the configuration described above, the projecting parts formed around a portion in which the first member fits into the second member can suppress the adhesive agent from being deformed around this portion. Consequently, it is possible to maintain the fitting state of both members in good condition.

In the vehicle seat described above, the second projecting portion may be formed to be symmetric with respect to both a first virtual plane and a second virtual plane, the first virtual plane being perpendicular to the adhering surface, the second virtual plane being perpendicular to both the adhering surface and the first virtual plane. Each projecting portion may be formed at a position opposite to a region on the outer circumferential surface of the second projecting portion, the region being other than a farthest region from a line of intersection of the first virtual plane and the second virtual plane.

According to the configuration described above, enlargement of the first member can be prevented even if the projecting parts are formed on both sides of the second projecting portion.

In the vehicle seat described above, the projecting portion or each projecting portion may be a bead portion formed into a curved shape as seen from the protruding direction.

According to the configuration described above, the projecting portion or projecting parts are formed into a curved shape as seen from the protruding direction thereof and thus have a considerable length as seen from this direction. Therefore, it is possible to effectively suppress the deformation of the adhesive agent in proportion to this length, further improving the strength at which the first member adheres to the second member.

The vehicle seat described above may further include: a seat main body on which an occupant is to sit; link members provided on both sides of the vehicle seat in a width direction of the vehicle seat, the link members supporting the seat main body in such a way that the seat main body can move upward and downward relative to the base member positioned under the seat main body; a pipe member disposed between the link members in the width direction; and a connection member connecting the link members to the pipe member. When the first member is the connection member and the second member is the link member, the projecting portion may be integrally molded with the connection member.

According to the configuration described above, integrally molding the connection member and the projecting portion or projecting parts improves stiffness of the connection member itself when it is attached.

In the vehicle seat described above, a through-hole may be formed in each link member. The connection member may have a fitting projection protruding from a portion of the adhering surface which is different from a portion with the projecting portion formed, the fitting projection fitting into the through-holes. A region of at least a portion of the outer circumferential surface of the fitting projection may be formed into a flat surface.

According to the configuration described above, the fitting projection functions as a rotation stopper, preventing the connection member from rotating relative to the link members.

In the vehicle seat described above in which the fitting projection is formed in the connection member, the connection member may include: a base portion provided with the adhering surface as one side surface; and a rotation stopper, when the connection member is inserted into the pipe member, mating with an engaged portion formed in the pipe member, thereby suppressing the connection member from rotating relative to the pipe member. The rotation stopper may be formed on a non-adhering surface of the base portion which is positioned on an opposite side of the adhering surface. In the base portion, a region in which the rotation stopper is formed on the non-adhering surface may be different from a region in which the projecting portion is formed on the adhering surface.

According to the configuration described above, when both the rotation stopper and the projecting portion are formed in the base portion of the connection member, these two parts are formed on the respective surfaces of the base portion positioned opposite to each other. Therefore, a process of forming the parts is performed easily.

In the vehicle seat described above, a cutout portion may be formed on a circumference of the through-hole. The connection member may have a rotation stopper disposed within the cutout portion when the fitting projection fits into the through-holes, the rotation stopper suppressing the connection member from rotating relative to the link member. A first fastening hole that takes the shape of a circular hole may be formed at an end of the link member, the first fastening hole being formed to secure the link member to the seat main body. A second fastening hole that takes the shape of a circular hole may be formed at the other end of the link member, the second fastening hole being formed to secure the link member to the base member. The cutout portion may be formed to not traverse a virtual straight line passing through both centers of the first fastening hole and the second fastening hole.

According to the configuration described above, even if the cutout portion is formed in each link member as a hole into which the rotation stopper formed in the connection member fits, the cutout portion does not traverse a portion of each link member which is positioned between the first fastening hole and the second fastening hole. Therefore, it is possible to ensure stiffness of the portion of each link member which is positioned between the first fastening hole and the second fastening hole.

The vehicle seat described above may include: a seatback frame provided in a seatback of the vehicle seat; a seat cushion frame provided in a seat cushion of the vehicle seat;

a reclining unit having a casing fixed to the seatback frame; and a connection bracket connecting the seatback frame to the seat cushion frame by being fixed to both the seat cushion frame and the casing. If the first member is the connection bracket and the second member is at least one member of the seat cushion frame and the casing, each projecting portion may be a bead portion that protrudes toward the at least one member and extends along an outer side of the casing.

According to the configuration described above, the bead portion is formed along the outer edge of the casing as the projecting portion. Therefore, it is possible to suppress effectively a deformation of the adhesive agent in proportion to the length of the bead portion in the longitudinal direction, resulting in improvement of the strength at which at least one member of the casing and the seat cushion adheres to the connection bracket.

In the vehicle seat described above, an elongated hole may be formed in a region of the first member which faces the second member with the adhesive agent layer therebetween, the elongated hole extending in a direction crossing the bead portion. The adhesive agent layer may partially stick out from the elongated hole.

According to the configuration described above, the adhesive agent that sticks out from the elongated hole formed to extend in the direction crossing the bead portion allows the first member to adhere to the second member through the outer edge of the elongated hole. In addition, the longitudinal direction of the elongated hole crosses the bead portion. Specifically, when a load perpendicular to the bead portion acts, the above configuration can still maintain a stable state where the first member adheres to the second member, because the first member adheres to the second member through the outer edge of the above elongated hole that extends in the same direction as that in which the load acts.

According to an embodiment, an adhesive agent is suppressed from being deformed outward from an adhering surface. In addition, the adhesive agent is suppressed from being deformed in all directions by a projecting portion. As a result, this makes it possible to maintain a stable state where a first member is bonded to a second member, suppressing the bonded members from being separated from each other.

According to an embodiment, a projecting portion formed around a portion in which the first member fits into the second member suppresses the adhesive agent from being deformed around this portion, maintaining a fitting state of both members in good condition.

According to an embodiment, even if projecting parts are formed on both sides of a second projecting portion, enlargement of the first member is prevented.

According to an embodiment, a projecting portion has a considerable length as seen from a protruding direction thereof, and the adhesive agent can be suppressed effectively from being deformed in proportion to this length. This further improves a strength at which the first member adheres to the second member.

According to an embodiment, integrally molding the projecting portion and the connection member improves stiffness of the connection member itself when it is attached.

According to an embodiment, the fitting projection functions as the rotation stopper, preventing the connection member from rotating relative to the link member.

According to an embodiment, both the rotation stopper and the projecting portion are formed on the respective surfaces of the base portion in the connection member which are positioned opposite to each other. Therefore, a process of forming these parts is performed easily.

According to an embodiment, a cutout portion that acts as a hole into which the rotation stopper formed in the connection member fits does not traverse a portion of the link member which is positioned between the first fastening hole and the second fastening hole. Stiffness of this portion is thereby ensured.

According to an embodiment, a bead portion is formed along the outer edge of a casing, as a projecting portion. This makes it possible to suppress effectively the adhesive agent from being deformed in proportion to the length of the bead portion in the longitudinal direction, further improving the strength at which the connection bracket adheres to other members.

According to an embodiment, if a load perpendicular to the bead portion acts, it is still possible to stabilize the state where the first member adheres to the second member, because the first member adheres to the second member through the outer edge of an elongated hole that extends in the same direction as that in which the load acts.

BRIEF DESCRIPTION OF THE DRAWINGS

The following diagrams illustrate embodiments of the invention.

DETAILED DESCRIPTION

A vehicle seat according to an embodiment of the present invention will be described below with reference to FIGS. 1 to 19. The embodiment that will be described below is an example for use in facilitating an understanding of the present invention and not intended to limit the present invention. Shapes, sizes, arrangements and the like of members that will be described below can be modified and improved without departing from the spirit of the present invention, and their equivalents are obviously included in the present invention.

In the following description, a front to back direction refers to a direction that is identical to a direction a vehicle travels in. A width direction refers to a direction along the width of the vehicle and corresponds to a width direction of a vehicle seat of the present invention. An upward to downward direction refers to an upward to downward direction of the vehicle.

Basic Configuration of Vehicle Seat

First, a description will be given of a basic configuration of a vehicle seat (referred to below as a main seat S) according to an embodiment of the present invention.

Figure 1:
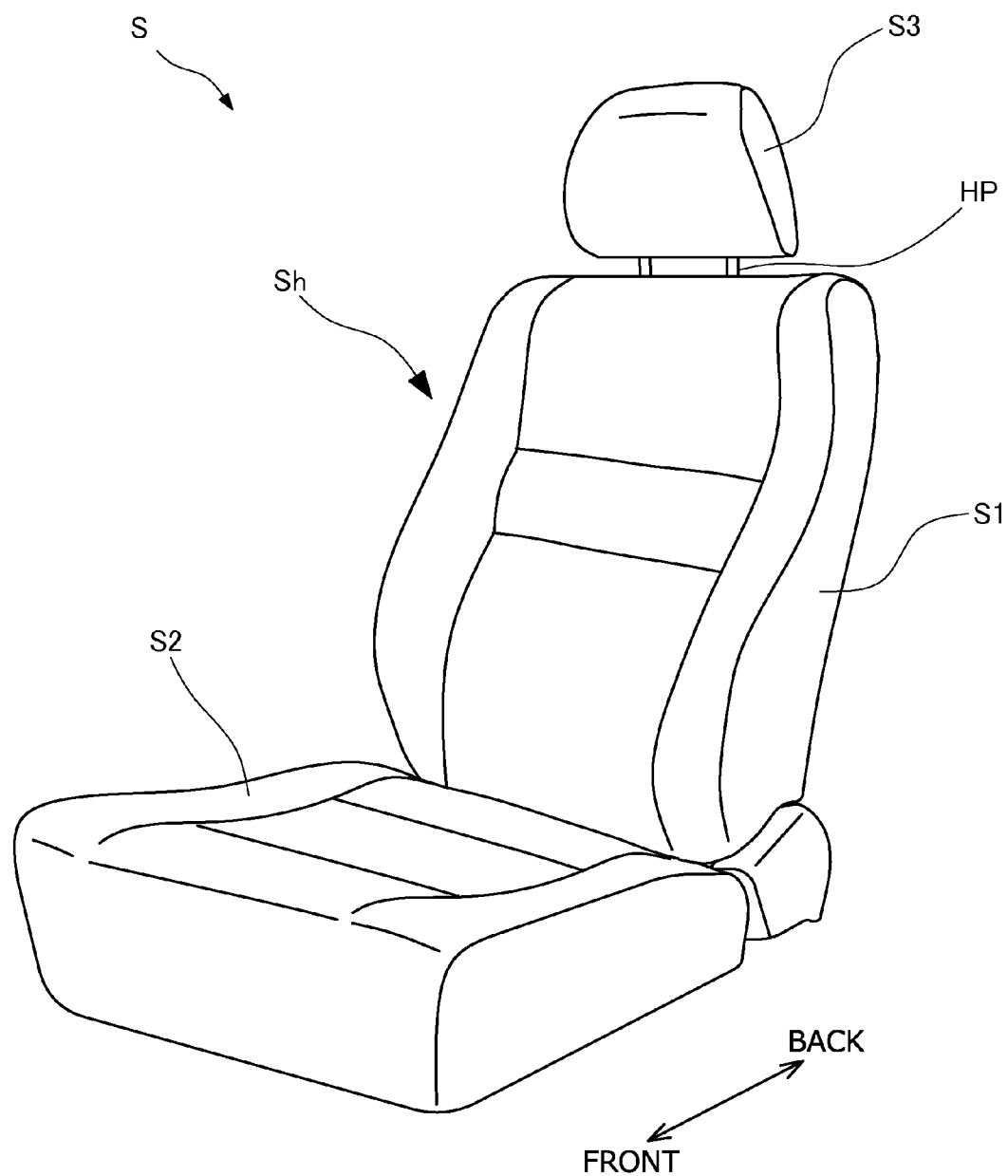
FIG. 1 is an exemplary perspective view of a vehicle seat according to an embodiment of the present invention.

The main seat S has a seat main body Sh on which an occupant is to sit, as a primary constituent element; the seat main body Sh includes a seatback S1, a seat cushion S2 and a headrest S3, as illustrated in FIG. 1. A seat frame F that forms the framework of the main seat S includes a seatback frame 1 constituting the seatback S1, and a seat cushion frame 2 constituting the seat cushion S2, as main components.

Figure 2:
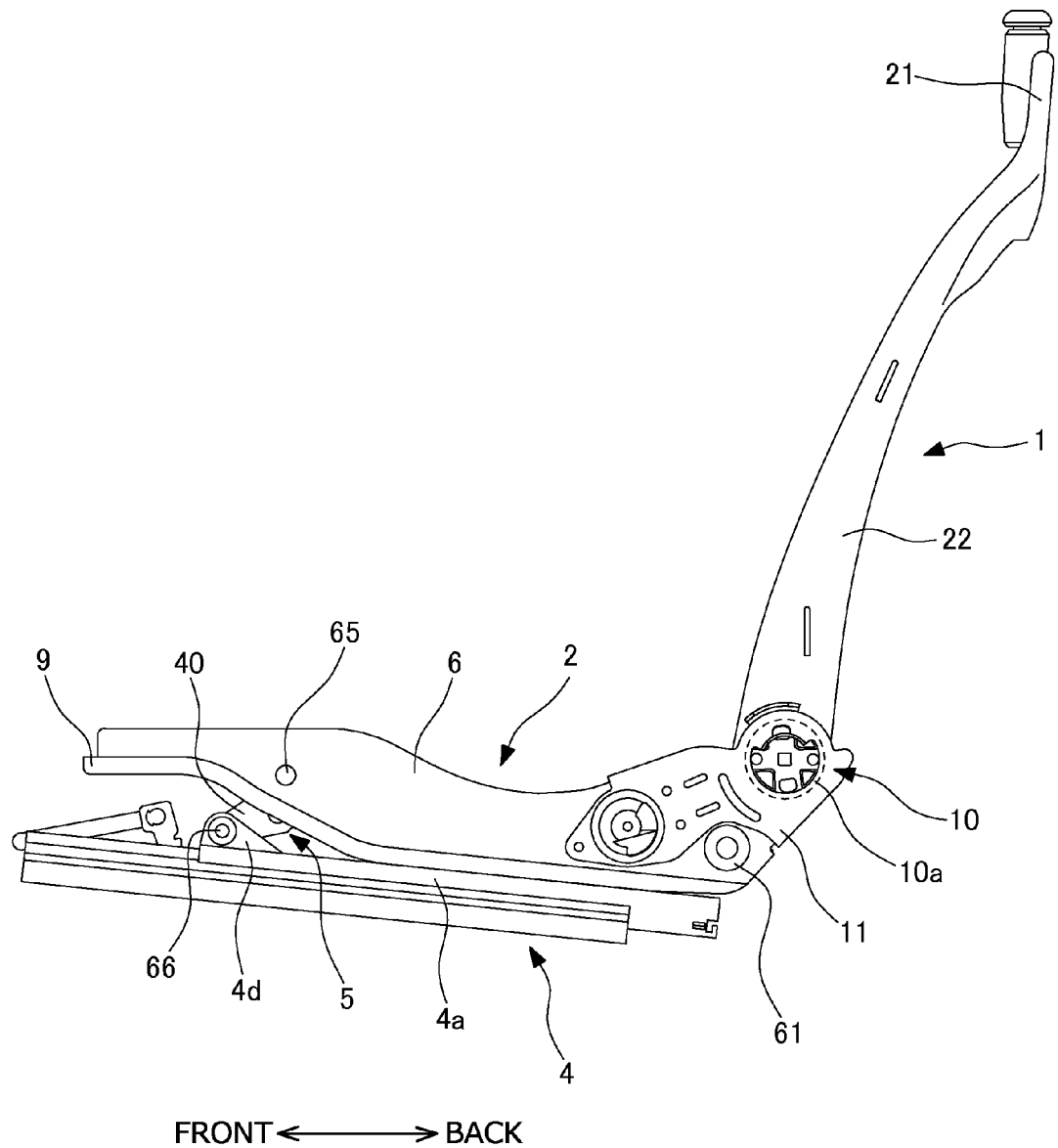
FIG. 2 is an exemplary side view illustrating a frame in the vehicle seat according to the embodiment of the present invention.

The seat cushion frame 2 is formed by integral molding of carbon fiber reinforced plastic (CFRP) and equipped with side-portion frames 6 on both sides in the width direction, as illustrated in FIG. 2, each side-portion frame 6 extending in the front to back direction.

The seatback frame 1 is formed by integral molding of CFRP and equipped with side frames 22 on both sides in the width direction, as illustrated in FIG. 2, each side frame 22 extending in the upward to downward direction. Reclining units 10 are attached to the lower ends of the side frames 22. These reclining units 10 are connected to the side-portion frames 6 at their rear ends by connection brackets 11. Specifically, the lower ends of the side frames 22 are connected to the rear ends of the side-portion frames 6 through the reclining units 10 and the connection brackets 11. The seatback frame 1 is thereby assembled to the seat cushion frame 2.

Each reclining unit 10 in the main seat includes a substantially cylindrical casing 10a and a drive mechanism (not shown) mounted in the casing 10a. The casings 10a are fixed to the outer surfaces of the side frames 22 in the width direction (the outer side surfaces of the side frames 22) at the lower ends. When the drive mechanisms are actuated within the casings 10a, the function of the reclining units 10 causes the seatback S1 to rotate relative to the seat cushion frame 2 in the front to back direction, or in a direction in which it reclines.

The connection brackets 11 extend in the front to back direction, and their front ends are fixed to the outer surfaces of the side-portion frames 6 in the width direction (the outer side surfaces of the side-portion frames 6). The rear ends of the connection brackets 11 are disposed at sites where the reclining units 10 are sandwiched between the rear ends and the outer side surfaces of the side frame 22 and fixed to the outer side surfaces of the casings 10a in the reclining units 10. Positioning the connection bracket 11 in this manner connects the seatback frame 1 to the seat cushion frame 2.

As illustrated in FIG. 2, the main seat S is equipped with a slide rail mechanism 4 positioned under the seat main body Sh. The slide rail mechanism 4 is a base member that supports the seat main body Sh to be able to slide in the forward and backward directions, and is attached to a vehicle body floor. Furthermore, the main seat S is equipped with a height adjustment mechanism 5 positioned between the seat cushion frame 2 and the slide rail mechanism 4 in the upward to downward direction.

Figure 3:
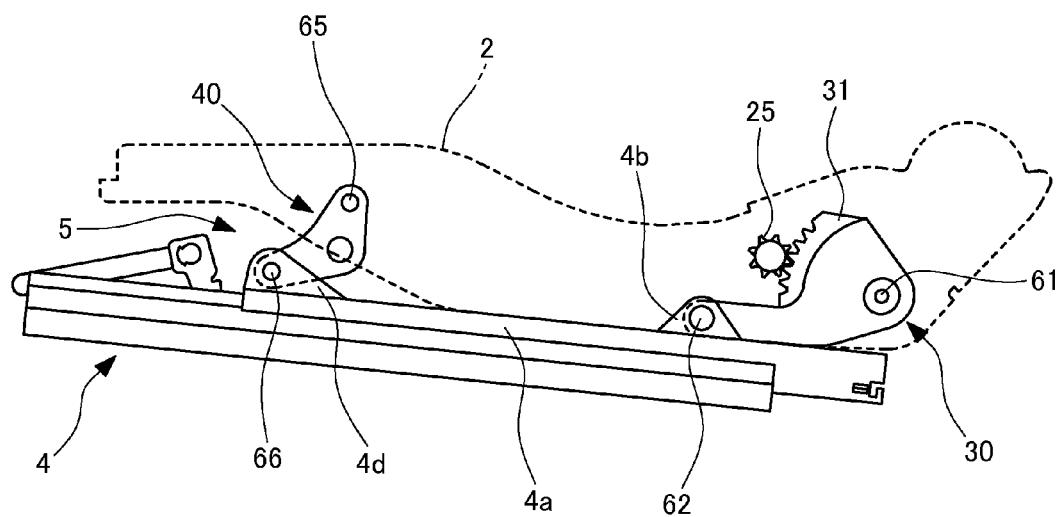
FIG. 3 is an explanatory side view diagram of a height adjustment mechanism, while illustrating the vehicle seat in a normal state.
Figure 4:
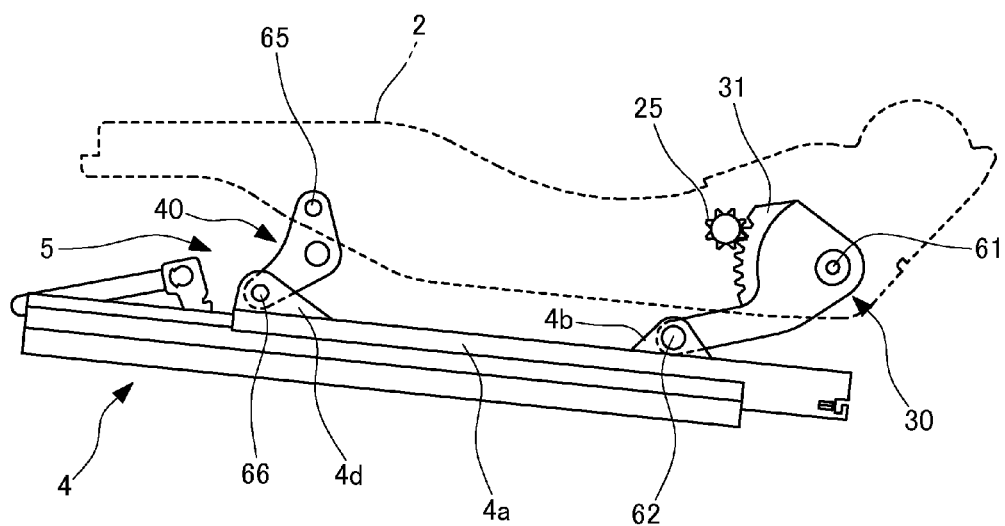
FIG. 4 is an explanatory side view diagram of the height adjustment mechanism, while illustrating the vehicle seat positioned at an upper limit location.

The height adjustment mechanism 5 is a mechanism that adjusts the height of the seat and actuated in response to an occupant's operation of an operating lever (not illustrated). As illustrated in FIGS. 3 and 4, the height adjustment mechanism 5 has rear-side links 30 and front-side links 40 that serve as link members, as primary constituent elements. In order to support the seat main body Sh to be able to move upward and downward respective to the slid rail mechanism 4, the rear-side links 30 are provided on both sides of the slide rail mechanism 4 in the width direction, and the front-side links 40 are also provided on both sides of the slide rail mechanism 4 in the width direction.

Figure 5:
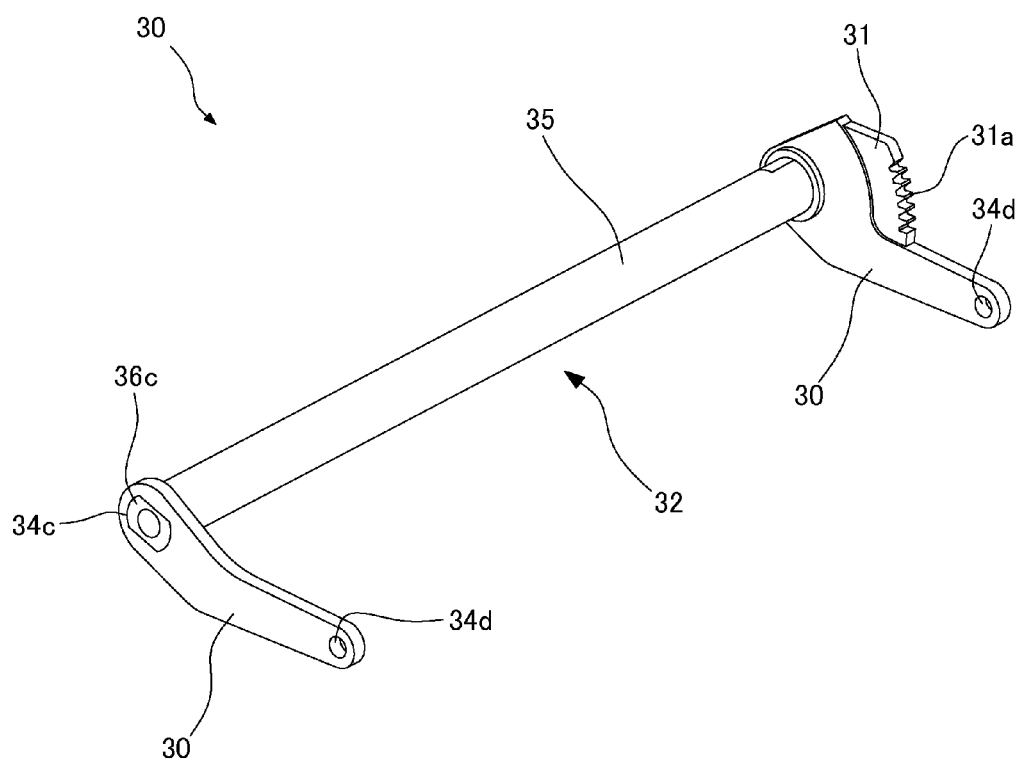
FIG. 5 is an explanatory perspective view illustrating a rear-side link.

To give a more specific description, the rear-side links 30 are arm-shaped members each made of CFRP and disposed on the inner sides of the side-portion frames 6 in the width direction. In addition, the rear-side links 30 are attached to the side-portion frames 6 at their rear ends through frame rear-side shaft pins 61. These frame rear-side shaft pins 61 are inserted into and pass through shaft holes (not illustrated) formed at the rear ends of the side-portion frames 6. As illustrated in FIG. 5, pin holes 34c, each of which is a through-hole, are formed at ends of the rear-side links 30. The frame rear-side shaft pins 61 are also inserted into and pass through these pin holes 34c. In this manner, the rear-side links 30 are supported by the frame rear-side shaft pins 61 in such a way that they can rotate relative to the side-portion frames 6 in the upward and downward directions and the forward and backward directions.

Pin holes 34d illustrated in FIG. 5 are formed at the other end of the rear-side links 30, and a rail rear-side shaft pin 62 is inserted into and passes through the pin holes 34d. As illustrated in FIGS. 3 and 4, a movable rail 4a in the slide rail mechanism 4 is provided with a link support projection 4b that protrudes upward from its upper surface; a shaft hole (not illustrated) into which the rail rear-side shaft pin 62 is inserted is formed in the link support projection 4b. The rail rear-side shaft pin 62 is inserted into and passes through this shaft hole and the above pin holes 34d whereby the rear-side links 30 are supported to be able to rotate relative to the slide rail mechanism 4 in the upward and downward directions and the forward and backward directions.

As illustrated in FIGS. 3 and 4, of the rear-side links 30 provided on both sides in the width direction, for example, the rear-side link 30 positioned closer to the nearest door (referred to below as a one-end rear-side link 30) has a substantially fan-shaped sector gear 31 embedded therein. The sector gear 31 engages with a pinion gear 25. When the above operating lever is operated, this pinion gear 25 rotates, displacing where the gears engage with each other. As a result, the one-end rear-side link 30 rotates while moving between respective sites illustrated in FIGS. 3 and 4.

As illustrated in FIG. 5, a connection pipe 35 as a pipe member is placed between the rear-side links 30 provided on both sides in the width direction; the rear-side links 30 are interconnected by the connection pipe 35. Thus, when the one-end rear-side link 30 rotates, the rear-side link 30 positioned on the opposite side (referred to below as the other-end rear-side link 30) follows this movement, rotating in the same direction.

Figure 7:
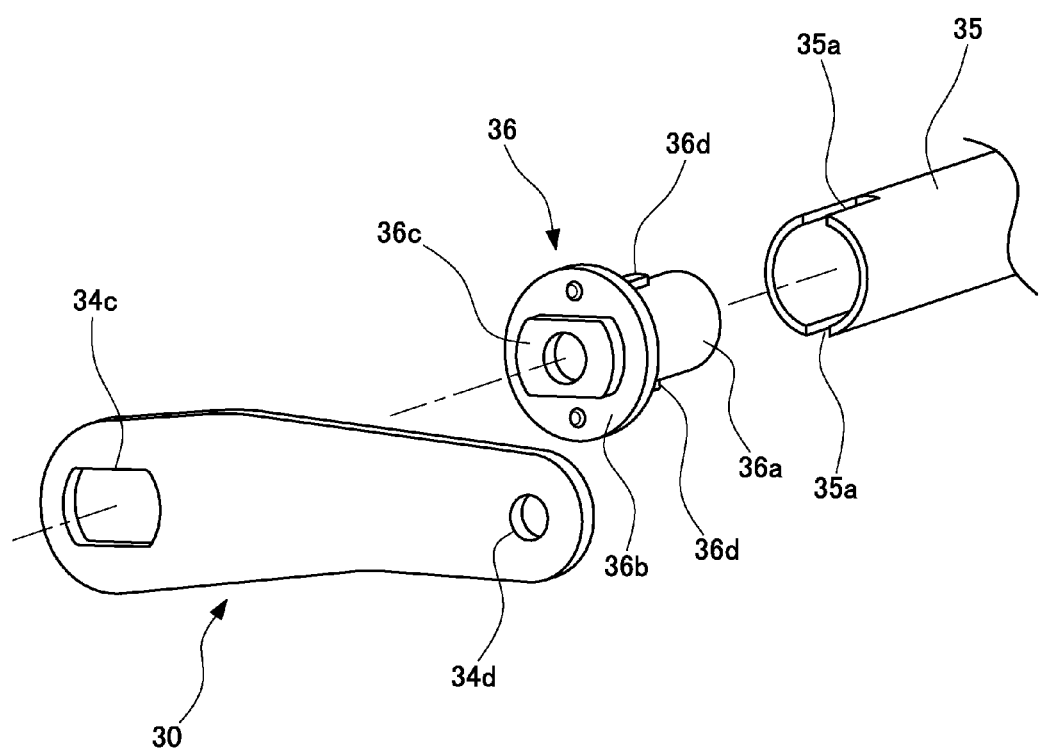
FIG. 7 is an explanatory exploded perspective view diagram of a configuration in which the rear-side link is connected to the connection pipe.

In the main seat S, the connection pipe 35 is not attached directly to both rear-side links 30; joint members 36 are disposed between the rear-side links 30 and both ends of the connection pipe 35, as illustrated in FIG. 7. The joint members 36 correspond to an example of a connection member and are resin molded products that connect the rear-side links 30 and the connection pipe 35.

Each joint member 36 has a substantially cylindrical shape, and a hole is formed across each joint member 36. When the rear-side links 30 are connected to the connection pipe 35 through the joint members 36, the inner space of the connection pipe 35, the through-holes in the joint members 36, and the pin holes 34c formed in the rear-side links 30 communicate with one another. In addition, the frame rear-side shaft pins 61 that have been inserted and passed through the pin holes 34c are also inserted into and pass through the through-holes in the joint members 36. An exemplary configuration of each joint member 36 will be described later in detail.

The front-side links 40, each of which is made of CFRP, are substantially V-shaped members in side view, and disposed on the inner sides of the side-portion frames 6 in the width direction. The front-side links 40 are attached to the front ends of the side-portion frames 6 through frame front-side shaft pins 65. These frame front-side shaft pins 65 are inserted into and pass through shaft holes (not illustrated) formed at the front ends of the side-portion frames 6.

Figure 6:
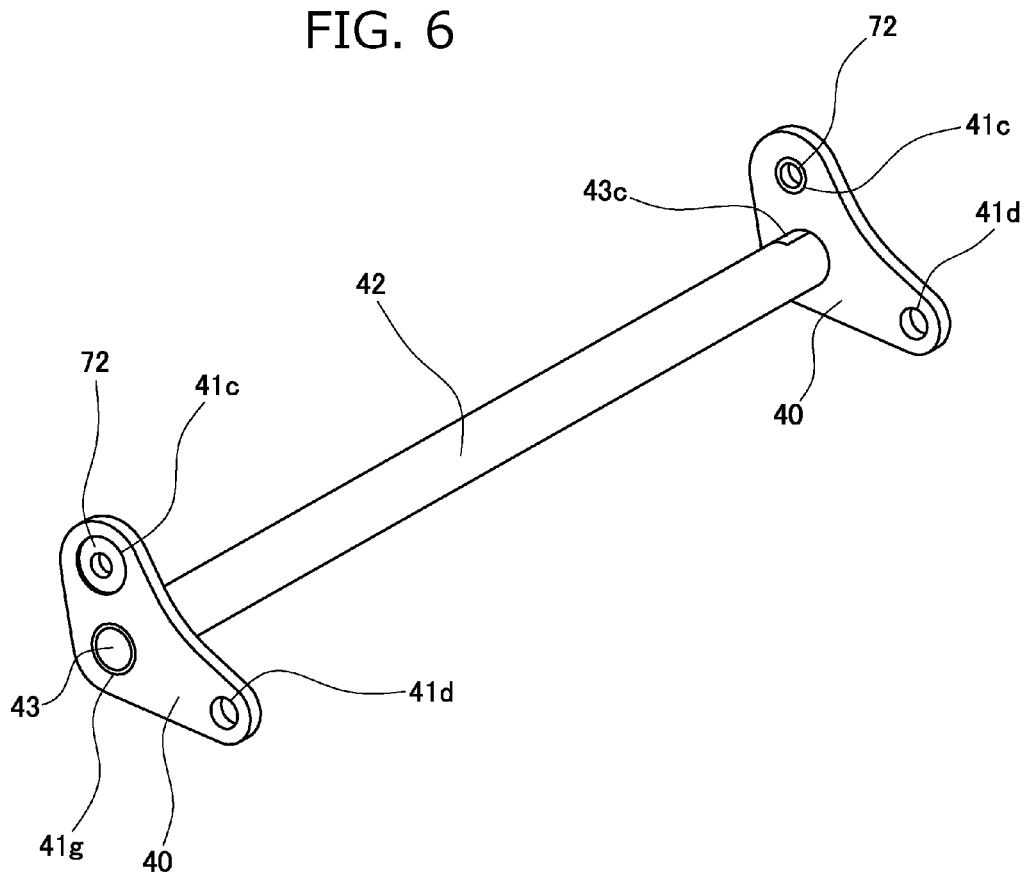
FIG. 6 is a schematic perspective view illustrating a front-side link.

The ends of the frame front-side shaft pins 65 are inserted into and pass through pin holes 41c, as illustrated in FIG. 6, formed at the ends of the front-side links 40. Consequently, the front-side links 40 are supported by the frame front-side shaft pins 65 in such a way that they can rotate relative to the side-portion frames 6 in the upward and downward directions and the forward and backward directions. Herein, the pin hole 41c formed at the end of each front-side link 40 corresponds to a first fastening hole formed in order to secure the front-side links 40 to the side-portion frames 6, or parts of the seat main body Sh.

The pin hole 41c formed at the end of each front-side link 40 is formed into the shape of a circular hole. In the main seat S, as illustrated in FIG. 6, a metal bushing 72 is disposed in each pin hole 41c; each frame front-side shaft pin 65 is inserted into the through-hole in the metal bushing 72.

As illustrated in FIG. 6, a pin hole 41d is formed at the other end of each front-side link 40. Each pin hole 41d is formed into the shape of a circular hole; a rail front-side shaft pin 66 is inserted into and passes through the pin holes 41d.

As illustrated in FIGS. 3 and 4, the movable rail 4a in the slide rail mechanism 4 is provided with a link support projection 4d that protrudes upward from its upper surface; a shaft hole (not illustrated) into which the rail front-side shaft pin 66 is inserted is formed in the link support projection 4d. The rail front-side shaft pin 66 is inserted into and passes through this shaft hole and the above pin holes 41d whereby the front-side links 40 are supported to be able to rotate relative to the slide rail mechanism 4 in the upward and downward directions and the forward and backward directions. Herein, each pin hole 41d corresponds to a second fastening hole in order to secure the front-side links 40 to the slide rail mechanism 4.

When the rear-side links 30 rotate, the side-portion frames 6 assembled to the rear-side links 30 by the frame rear-side shaft pins 61 move vertically. Together with this, the front-side links 40 assembled to the front ends of the side-portion frames 6 follows the rear-side links 30, rotating while moving between sites illustrated in FIGS. 3 and 4.

Figure 13:
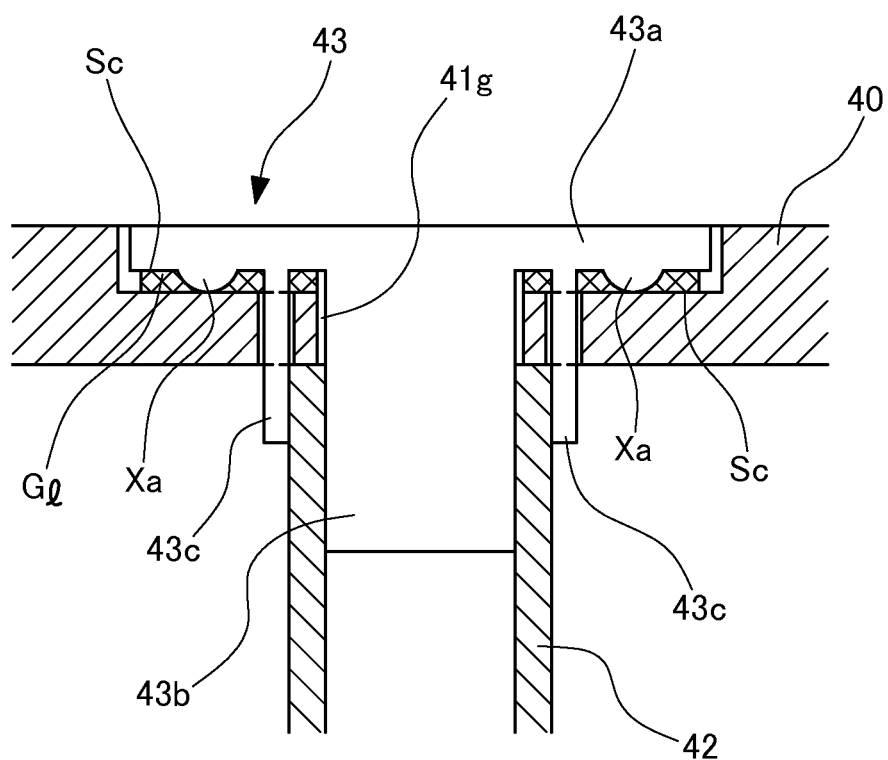
FIG. 13 is a side view explanatory diagram of an adhering structure between the front-side link and a connection pin that serves as a connection member according to the embodiment of the present invention.

As illustrated in FIG. 6, a connection pipe 42 as a pipe member is disposed between the front-side links 40 provided on both sides in the width direction and connects the front-side links 40. A connection hole 41g as a through-hole is formed at the center of each front-side link 40 in order to secure the connection pipe 42 to both front-side links 40. Connection pins 43 as illustrated in FIG. 13 are inserted into and pass through the respective connection holes 41g while the connection holes 41g communicate with the inner space of the connection pipe 42.

Each connection pin 43 corresponds to another example of the connection member and is a resin molded product that connects the front-side link 40 and the connection pipe 42. The connection pins 43 that have been inserted into and pass through the above connection holes 41g are also inserted into and pass through the connection pipe 42. Pin heads 43a of the connection pins 43 are bonded to the outer surfaces of the front-side links 40 in the width direction (the outer side surfaces thereof). An exemplary configuration of each connection pin 43 will be described in detail later.

The front-side links 40 are each molded with CFRP as described above. A plurality of through-holes (i.e., the pin holes 41c and 41d and the connection hole 41g) is formed in each front-side link 40. In this case, a higher proportion of fibers existing in a portion of each front-side link 40 between the through-holes are aligned with one another in a direction from one of the through-holes to another through-hole. This makes it possible to reduce stretching of the portion between the through-holes when a load is input to a front-side link 40 such that the spacing between the through-holes increases. It is thus possible to stabilize the locations of the through-holes, that is, the locations of a shaft and a pin inserted into and passing through the through-holes.

It is of great importance to stabilize the locations at which the pin holes 41c and 41d are formed, because they serve as shaft holes into which shafts are inserted. For this reason, as compared with carbon fibers in other parts, a large proportion of carbon fibers in a portion of each front-side link 40 between the pin holes 41c and 41d are aligned with one another in a direction from one of the through-holes (i.e., the pin hole 41c) to another through-hole (i.e., pin hole 41d).

Adhering Structure between Sheet Constituent Members According to an Embodiment

The main seat S configured above employs a bonding technique using an adhesive agent as a technique for bonding sheet components. The adhering structure between sheet constituent members which is employed by the main seat S features. This adhering structure will be described below with reference to FIGS. 18 and 19. In the following description, one of two members bonded to each other with an adhesive agent is referred to as a first member X1 and the other is referred to as a second member X2.

Figure 18:
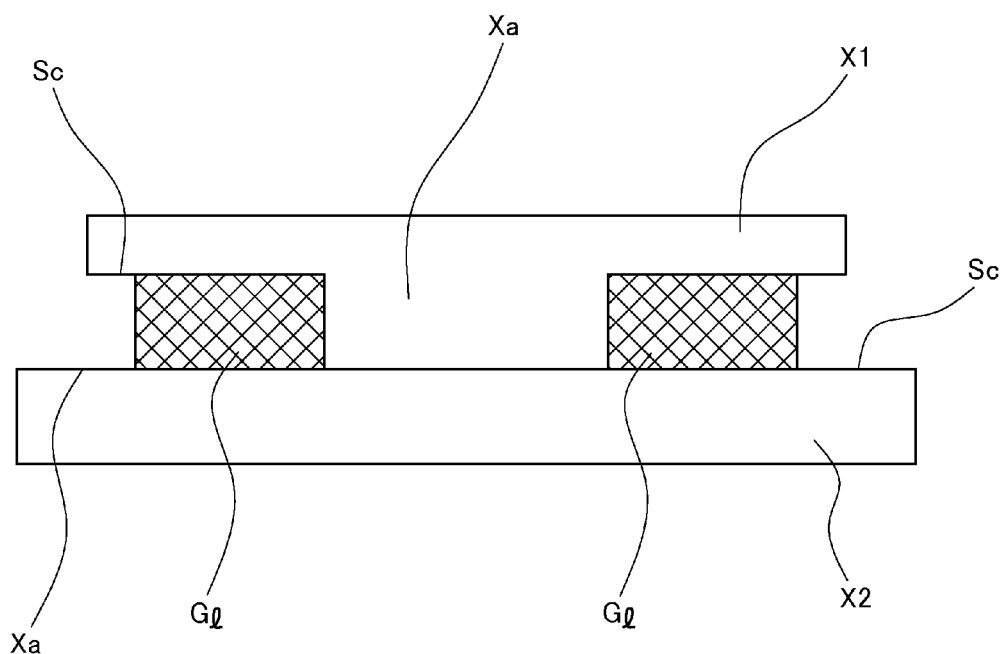
FIG. 18 is an explanatory diagram of the adhering structure according to an embodiment, as seen from the side.

The first member X1 and the second member X2 are members that the main seat S has as constituent elements; they are bonded with their adhering surfaces Sc facing each other, as illustrated in FIG. 18. The first member X1 is provided with a projecting portion Xa that protrudes from its adhering surface Sc toward the second member X2. The end of this projecting portion Xa abuts against the adhering surface Sc of the second member X2 upon the bonding.

In the bonding, for example, an adhesive agent is coated on the adhering surface Sc of the second member X2, and then the first member X1 is moved toward the second member X2 so that the adhering surfaces Sc of the first member X1 and the second member X2 are arranged close to each other. Then, the above projecting portion Xa presses and widens the uncured adhesive agent, thereby spreading it out over a wide area. Finally, an adhesive agent layer Gl (a hatched area in FIGS. 18 and 19) formed by the adhesive agent interposed between the first member X1 and the second member X2 is cured. In this way, the first member X1 is bonded to the second member X2 with the adhesive agent.

Figure 19:
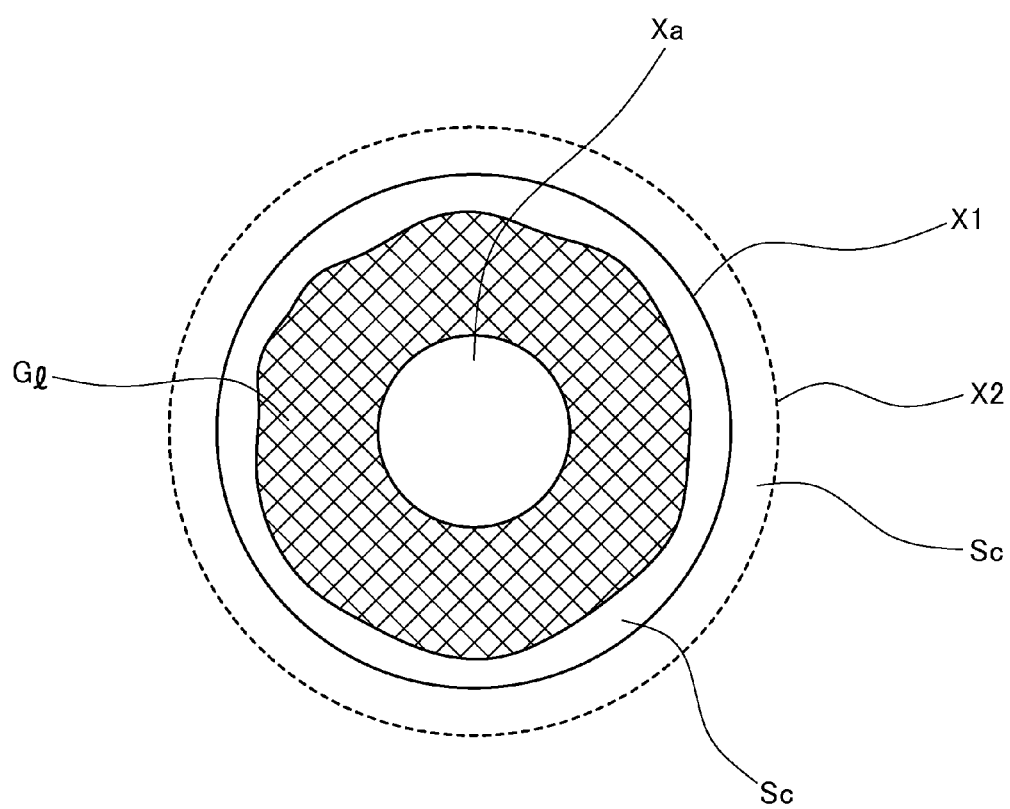
FIG. 19 is an explanatory diagram of the adhering structure according to an embodiment as seen from the top.

In the main seat S, as illustrated in FIGS. 18 and 19, the above projecting portion Xa is formed with an end to the other end in its protruding direction held on the inner side of an outer edge of the adhering surface Sc of the first member X1. This makes it possible to suppress the adhesive agent from being deformed outward from the adhering surfaces Sc.

To give a more specific description, if there is a configuration in which a portion of the projecting portion Xa protrudes from the outer edge of the adhering surface Sc, there is a risk that the adhesive agent may be deformed and stick out outward from the adhering surfaces Sc through the protruding portion of the projecting portion Xa. In contrast, in the main seat S, since the entire projecting portion Xa is held on the inner side of the outer edge of the adhering surface Sc, the adhesive agent can be suppressed from being deformed outward from the adhering surfaces Sc.

In the main seat S, as illustrated in FIG. 19, the adhesive agent layer Gl makes contact with the outer circumferential surface of the projecting portion Xa while surrounding the projecting portion Xa. In this configuration, when a load is placed on at least one member of the first member X1 and the second member X2 and transmitted to the adhesive agent layer Gl, a deformation of the adhesive agent is suppressed by the projecting portion Xa regardless of direction in which the load acts on the at least one member. In other words, because the adhesive agent layer Gl makes contact with the outer circumferential surface of the projecting portion Xa while surrounding the projecting portion Xa, the main seat S suppresses the adhesive agent from being deformed in all directions.

Due to the effects described above, the state where the first member X1 is bonded to the second member X2 in the main seat S can be maintained stably. Thus, when a load is input to the first member X1 or the second member X2, it is possible to suppress a deformation of the adhesive agent, thereby preventing the second member X2 bonded to the first member X1 from being separated therefrom.

In the configuration illustrated in FIGS. 18 and 19, the projecting portion Xa is provided only in the first member X1; however this configuration is not limiting. The second member X2 may also have a projecting portion Xa that protrudes from its adhering surface Sc toward the first member X1, provided the projecting portion Xa is formed in the first member X1.

A description will be given of an exemplary application of the above adhering structure that the main seat S employs.
First Exemplary Application The adhering structure described above is applied to the main seat S, for example, in order to bond the joint members 36 to the respective rear-side links 30. In the main seat S, actually, the joint members 36 are bonded to the respective rear-side links 30 with an adhesive agent, and the adhering structure According to an embodiment is employed as this adhering structure.

Figure 8:
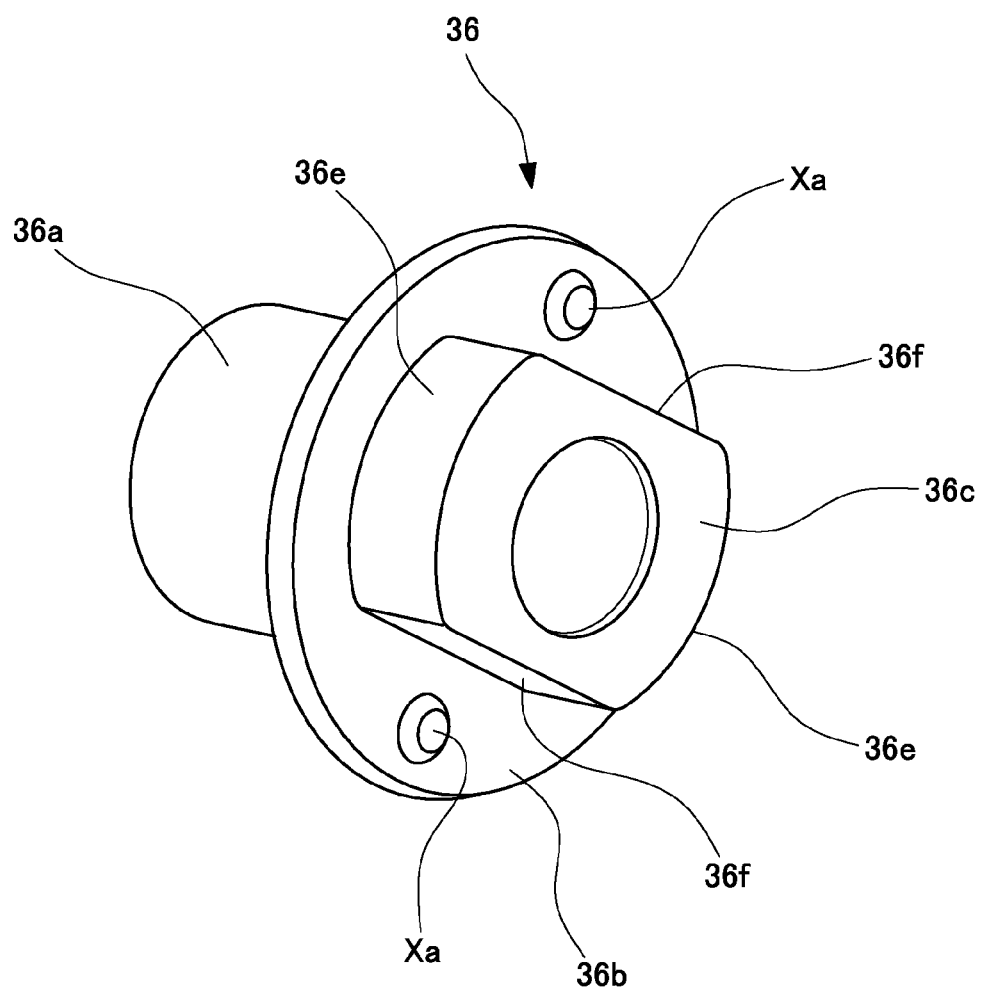
FIG. 8 is a perspective view illustrating a joint member that serves as a connection member according to the embodiment of the present invention.
Figure 9:
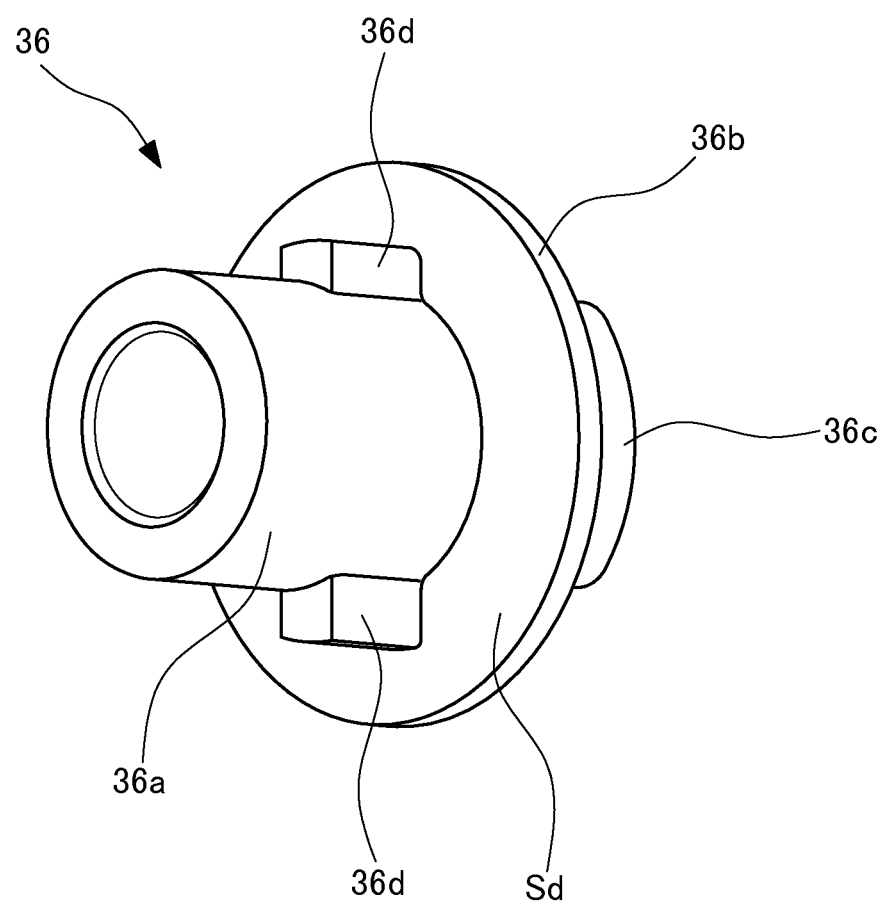
FIG. 9 is a perspective view illustrating the joint member as seen from the direction opposite to that in FIG. 8.

Before a description is given of the adhering structure between the joint member 36 and the rear-side link 30, an exemplary configuration of the joint member 36 will be described. As illustrated in FIGS. 8 and 9, the joint member 36 includes a cylindrical portion 36a, a flat disc-shaped base portion 36b disposed adjacent to the cylindrical portion 36a, and a fitting projection 36c protruding from the base portion 36b. Through-holes are formed in both the base portion 36b and the fitting projection 36c. Both through-holes communicate with each other and also communicate with the interior of the cylindrical portion 36a.

The cylindrical portion 36a is a portion that is inserted into the connection pipe 35 and fits into it when the joint member 36 connects the rear-side link 30 and the connection pipe 35. As illustrated in FIG. 9, convex portions 36d are formed on the cylindrical portion 36a at the end adjoining to the base portion 36b; each cylindrical portion 36a protrudes outward from the outer circumferential surface thereof. Each convex portion 36d is a substantially cuboid projection; the convex portions 36d are formed at two sites about 180 degrees apart from each other in a circumferential direction of the cylindrical portion 36a.

As illustrated in FIG. 7, rectangular notches 35a are formed at two sites at each end of the connection pipe 35 while being about 180 degrees apart from each other in a circumferential direction of the connection pipe 35. Each rectangular notch 35a corresponds to an engaged portion. When the cylindrical portion 36a is inserted into the connection pipe 35, the above convex portions 36d mate with the respective rectangular notches 35a. To give a more specific description, the above convex portions 36d are inserted into the respective notches 35a.

By inserting the convex portions 36d into the notches 35a corresponding to the convex portions 36d as described above, the joint member 36 can be suppressed from rotating relative to the connection pipe 35 while the cylindrical portion 36a is inserted into the connection pipe 35. Herein, the convex portions 36d correspond to a rotation stopper included in the joint member 36.

The base portion 36b has a somewhat larger outer diameter than that of the cylindrical portion 36a and is bonded to the inner surface of the rear-side link 30 in the width direction (the inner side surface thereof) when the joint member 36 connects the rear-side link 30 to the connection pipe 35. In the main seat S, the base portion 36b is bonded to the rear-side link 30 with an adhesive agent. Accordingly, the base portion 36b is provided with the adhering surface Sc as one of the side surfaces. More specifically, the surface of the base portion 36b opposite to the cylindrical portion 36a is the adhering surface Sc.

Figure 10:
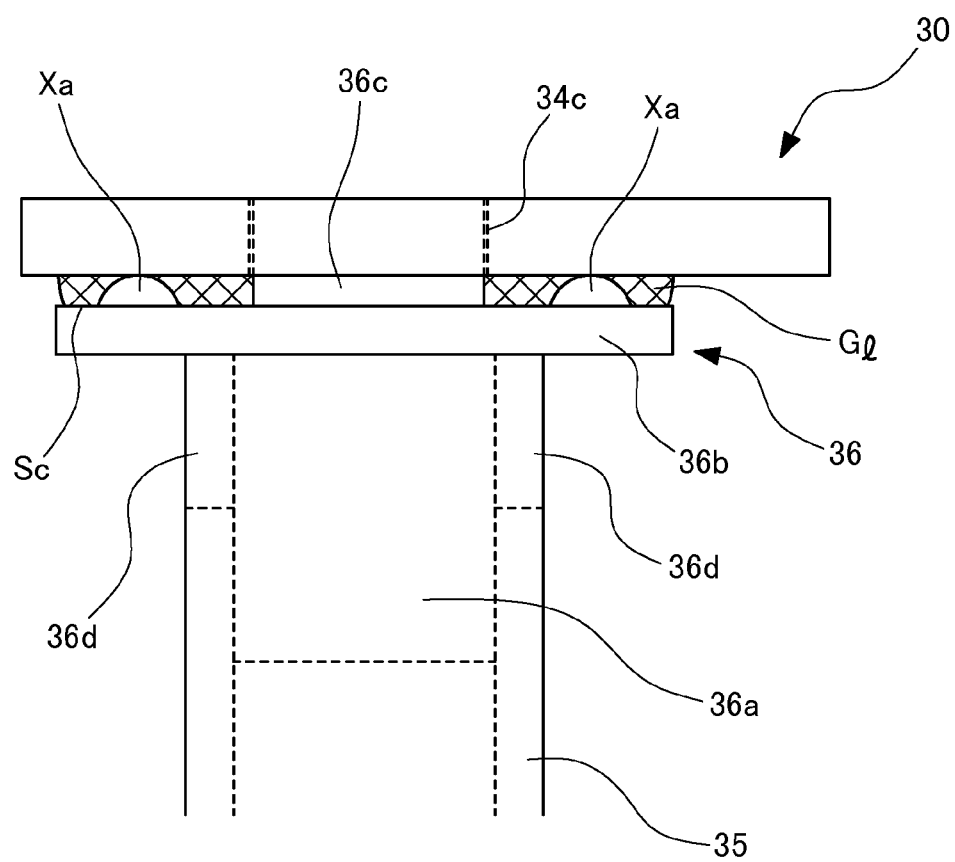
FIG. 10 is an explanatory diagram of an adhering structure between the joint member and the rear-side link.

As illustrated in FIG. 10, projecting parts Xa, each of which protrudes in a hemispherical shape, are formed on the adhering surface Sc included in the base portion 36b. In this exemplary application, the joint member 36 and the rear-side link 30 thus correspond to the first member X1 and the second member X2, respectively.

The adhering structure which has been described above is applied to the adhering structure between the joint member 36 and the rear-side link 30. To give a more specific description, the entire projecting parts Xa are held on the inner side of the outer edge of the base portion 36b. Furthermore, the adhesive agent layer Gl that is formed by the adhesive agent interposed between the base portion 36*b* and the rear-side link 30 makes contact with the outer circumferential surfaces of the projecting parts Xa while surrounding the projecting parts Xa, as illustrated in FIGS. 10 and 11A.

In the main seat S, the projecting parts Xa and the joint member 36 are integrally molded. To give a more specific description, when the joint member 36 is molded with a resin material, the projecting portion Xa and other parts of the joint member 36 are integrally molded. This improves the stiffness of the joint member 36 itself when it is attached.

Figure 11A:
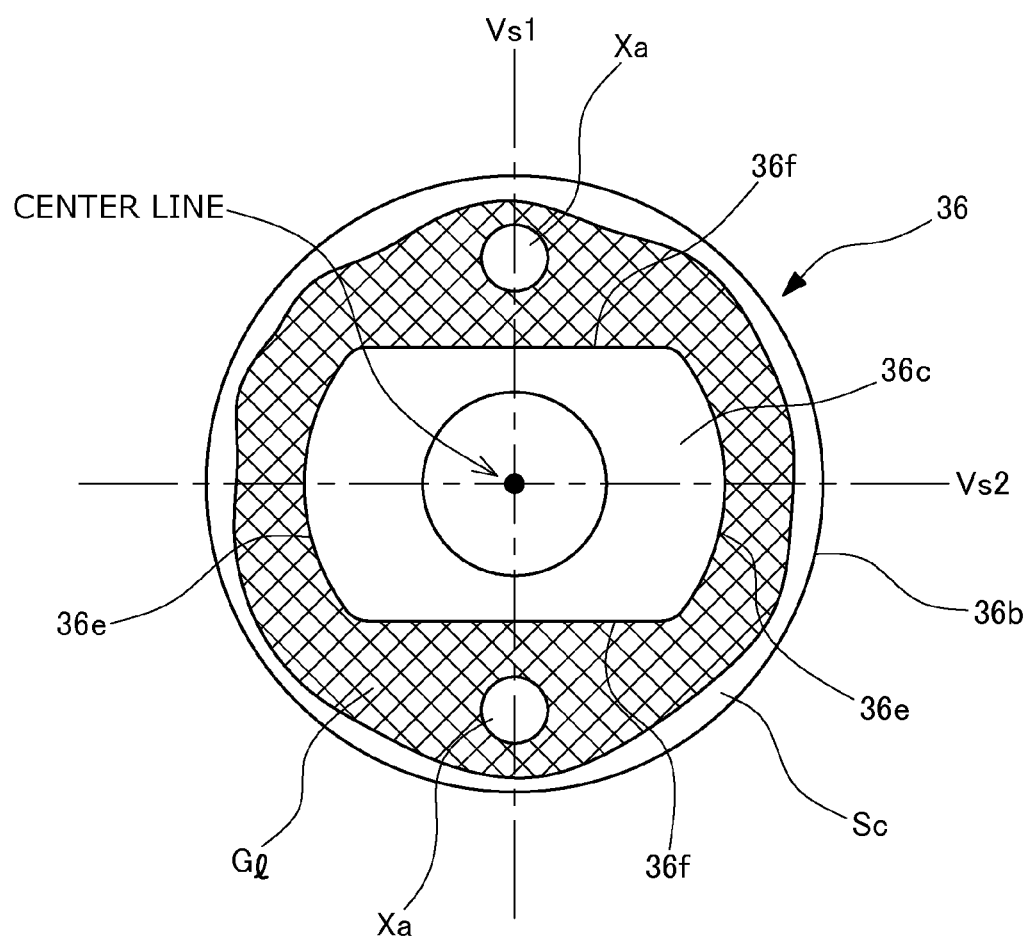
FIG. 11A is a top view diagram illustrating an adhering surface of the joint member.

As illustrated in FIGS. 8, 10 and 11A, the plurality of projecting parts Xa are formed on the adhering surface Sc of the base portion 36*b*. In the main seat S, they are formed at two sites apart from each other. However, the two projecting parts Xa are not limiting and the number of projecting parts Xa can be set to an arbitrary number.

The fitting projection 36*c* protrudes from a portion of the adhering surface Sc of the base portion 36*b* which is different from a portion thereof with the projecting parts Xa formed. This fitting projection 36*c* corresponds to a second projecting portion. To give a more specific description, the adhering surface Sc of the base portion 36*b* is a circular surface. As illustrated in FIG. 10, the fitting projection 36*c* is provided in a substantially central portion of this adhering surface Sc, and the projecting parts Xa are provided in portions of the adhering surface Sc which are positioned on both sides of the fitting projection 36*c*. In other words, the fitting projection 36*c* protrudes from a portion of the adhering surface Sc sandwiched between the two projecting parts Xa.

Figure 12:
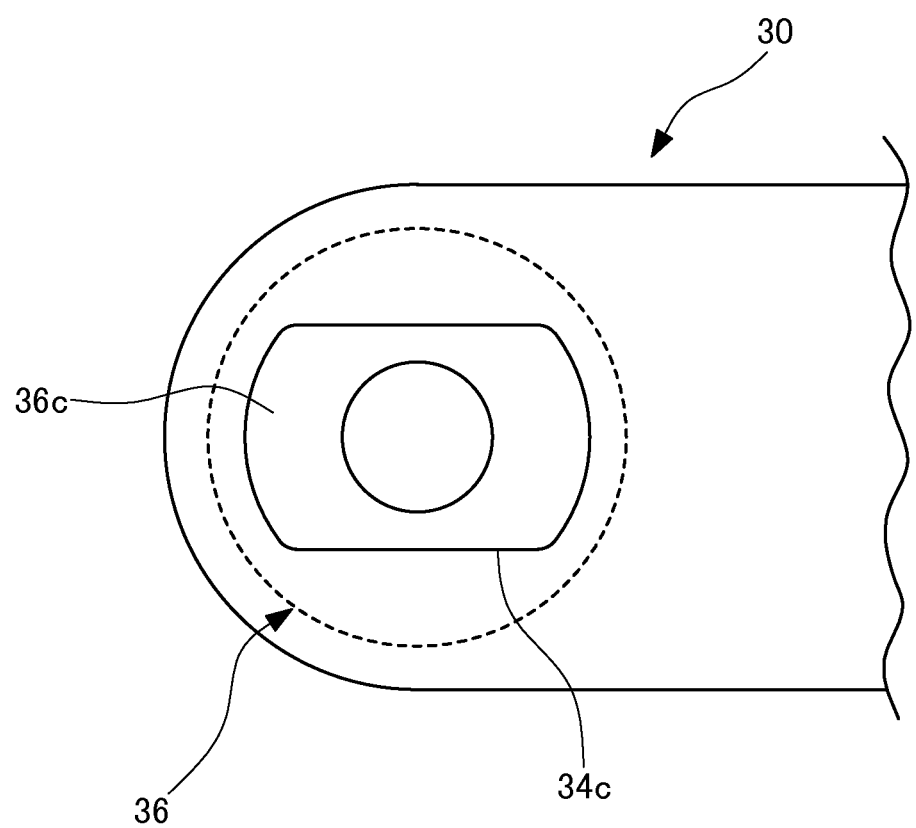
FIG. 12 is a top view diagram illustrating a portion of the rear-side link to which the joint member is bonded.

As illustrated in FIG. 12, when the joint member 36 connects the rear-side link 30 to the connection pipe 35, the fitting projection 36*c* fits into the pin hole 34*c* formed at the end of the rear-side link 30. That is, in the main seat S, the pin hole 34*c* formed at the end of the rear-side link 30 thus functions as a fitting hole.

In the main seat S, as described above, the fitting projection 36*c* fits into the pin hole 34*c*, and they adhere to each other with the adhesive agent so that the joint member 36 and the rear-side link 30 are interconnected. This enables the bonding state of the rear-side link 30 and the joint member 36 to be maintained firmly in comparison with a configuration in which the rear-side link 30 simply adheres to the joint member 36.

In the main seat S, as described above, the projecting parts Xa are positioned on both sides of the fitting projection 36*c*. With these projecting parts Xa formed on both sides of the fitting projection 36*c*, the adhesive agent can be suppressed from being deformed around the fitting projection 36*c* and the pin hole 34*c*. Consequently, it is possible to maintain the fitting state of the fitting projection 36*c* and the pin hole 34*c* in good condition, thus enabling a more stable adhering state between the rear-side link 30 and the joint member 36.

As illustrated in FIGS. 8 and 11A, the outer circumferential surface of the fitting projection 36*c* includes arc-shaped curved surface regions 36*e* arranged symmetrically, and flat surface regions 36*f* each positioned between the arc-shaped curved surface regions 36*e*. Thus, the flat regions that are at least partially formed on the outer circumferential surface of the fitting projection 36*c* fulfil a function of preventing the rotation of the joint member 36. As a result, the joint member 36 does not make (relative) rotation with respect to the rear-side link 30.

As illustrated in FIG. 11A, the fitting projection 36*c* is formed to be symmetric with respect to both a first virtual plane Vs1 and a second virtual plane Vs2, in which the first virtual plane Vs1 is perpendicular to the adhering surface Sc of the base portion 36*b*, and the second virtual plane Vs2 is perpendicular to both the adhering surface Sc and the first virtual plane Vs1. Assuming that the line of intersection of the first virtual plane Vs1 and the second virtual plane Vs2 is the center line of the fitting projection 36*c*, each arc-shaped curved surface region 36*e* corresponds to the farthest region on the outer circumferential surface of the fitting projection 36*c* from the above-mentioned center line. Each flat surface region 36*f* corresponds to a region other than the furthest region from the above center line.

In the main seat S, the projecting parts Xa are formed at the positions opposite to the respective flat surface regions 36*f*. More specifically, they are formed at the positions opposite to the central portions of the respective flat surface regions 36*f*, these central portions being closest to the above center line. By disposing the projecting parts Xa close to the center line of the fitting projection 36*c* in this manner, enlargement of the joint member 36 can be prevented.

Figure 11B:
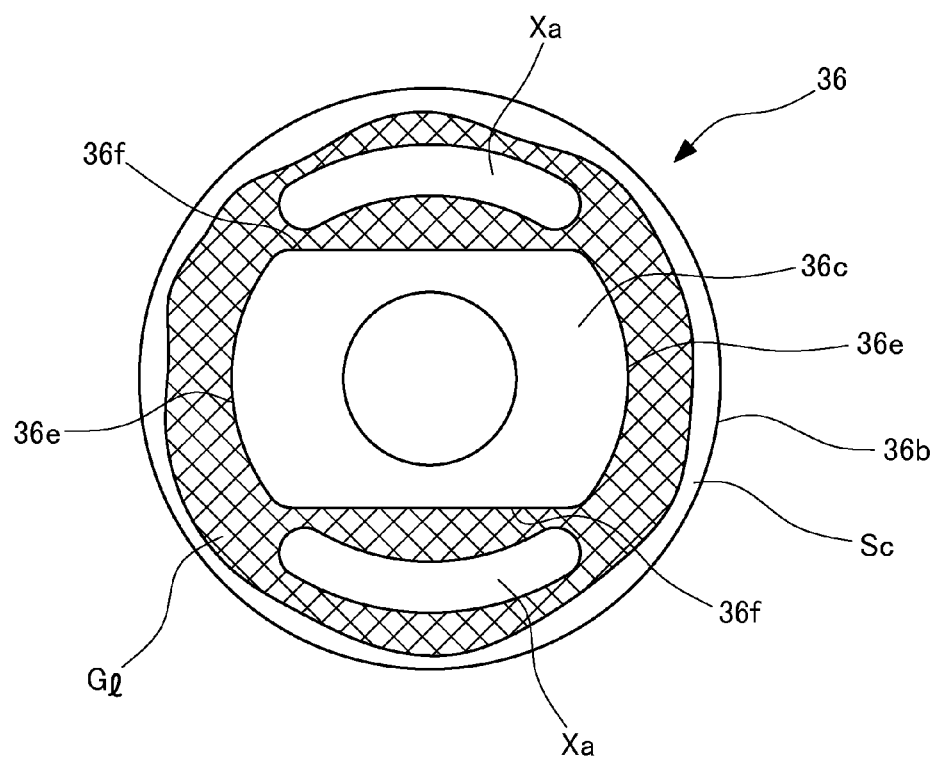
FIG. 11B is a top view diagram illustrating a modified example of the adhering surface of the joint member.

In the main seat S, each projecting portion Xa is formed into a substantially hemispherical shape. Further, it has a circular shape as seen from the protruding direction, as illustrated in FIG. 11A. However, this shape is not limiting; alternatively each projecting portion Xa may be a bead portion formed into a curved shape as seen from the protruding direction, as illustrated in FIG. 11B. Being such a bead portion formed in a curved shape, each projecting portion Xa has a considerable length as seen from the protruding direction. Accordingly, it is possible to suppress more effectively the deformation of the adhesive agent in proportion to this length, further improving the adhesion strength between the joint member 36 and the rear-side link 30.

In the joint member 36, the projecting parts Xa are formed on the adhering surface Sc of the base portion 36*b*. In addition, as illustrated in FIG. 9, the above convex portions 36*d* adjoin to each other on a non-adhering surface Sd of the base portion 36*b* which is positioned on the opposite side to the adhering surface Sc. In other words, the convex portions 36*d* are formed on the non-adhering surface Sd. Moreover, in the main seat S, the regions on the non-adhering surface Sd of the base portion 36*b* in which the convex portions 36*d* are formed are different from the regions on the adhering surface Sc in which the projecting parts Xa are formed. More specifically, in the main seat S, the convex portions 36*d* formed on the front surface of the base portion 36*b* are shifted in position from the projecting parts Xa formed on the rear surface thereof. This configuration eases a process of forming the convex portions 36*d* and the projecting parts Xa in the base portion 36*b*.

However, the above configuration is not limiting; alternatively the regions on the non-adhering surface Sd of the base portion 36*b* in which the convex portions 36*d* are formed may be aligned with or overlap the regions on the adhering surface Sc in which the projecting parts Xa are formed. This configuration increases the thickness of the base portion 36*b*, making it possible to further improve the stiffness of the joint member 36, although it is inferior in processing performance to the foregoing configuration (the configuration in which the convex portions 36*d* formed on the front surface of the base portion 36*b* are shifted from the projecting parts Xa formed on the rear surface thereof).

Second Exemplary Application

The adhering structure according to an embodiment is applied to the main seat S in order to bond the above-mentioned connection pins 43 to the respective front-side links 40. In the main seat S, actually, the connection pins 43 are bonded to the respective front-side links 40 with an adhesive agent, and the adhering structure According to an embodiment is employed as this adhering structure.

Before a description is given of the adhering structure between the connection pin 43 and the front-side link 40, an exemplary configuration of the connection pin 43 will be described. As illustrated in FIG. 13, the connection pin 43 includes a flat, disc shaped pin head 43*a* and a cylindrical pin main body 43*b* adjoining to the pin head 43*a*.

When the connection pin 43 secures the connection pipe 42 to the front-side link 40, the pin main body 43*b* is inserted into the connection hole 41*g* formed in the front-side link 40. Then, the pin main body 43*b* is inserted into the connection pipe 42, fitting into the connection pipe 42.

The pin head 43*a* has a larger outer diameter than the pin main body 43*b*. When the connection pin 43 secures the connection pipe 42 to the front-side link 40, it is bonded to the outer side surface of the front-side link 40, or more specifically to the outer edge of the connection hole 41*g*. Accordingly, the pin head 43*a* is provided with the adhering surface Sc as one of the side surfaces. More specifically, the surface of the pin head 43*a* on which the pin main body 43*b* is positioned is the adhering surface Sc. As illustrated in FIG. 13, the region on the outer side surface of the front-side link 40 to which the pin head 43*a* adheres, or the outer edge of the connection hole 41*g*, is more recessed than other regions.

Figure 14:
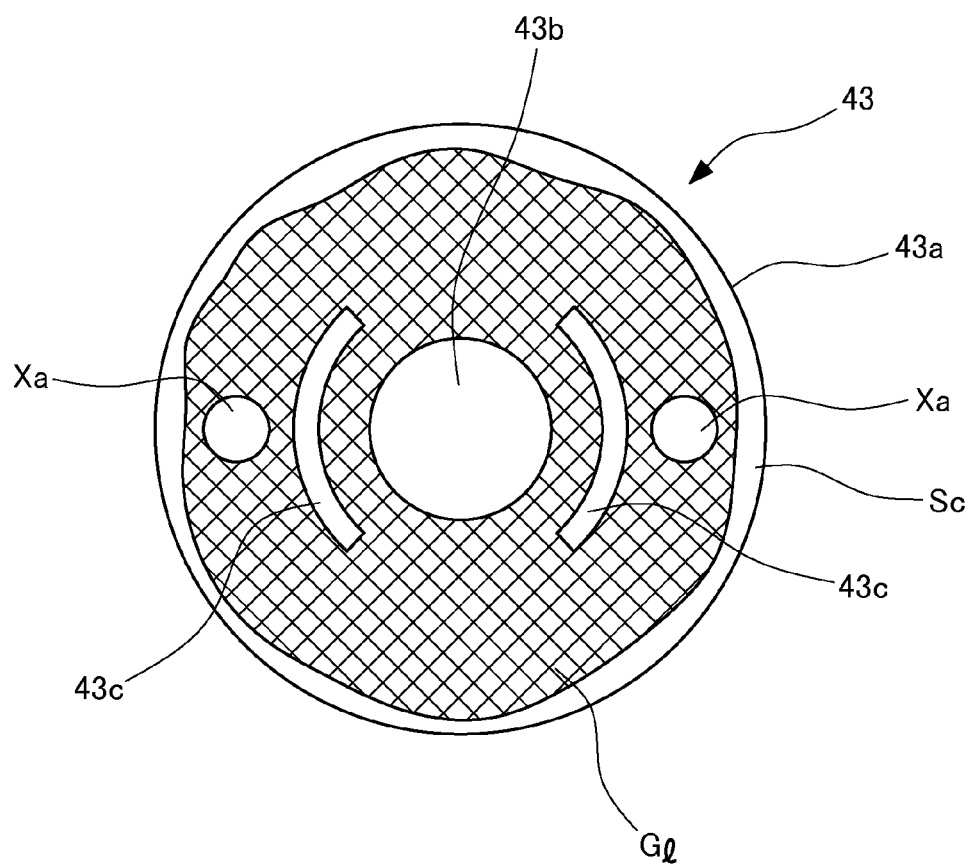
FIG. 14 is a top view diagram illustrating an adhering surface of the connection pin.

As illustrated in FIG. 13, projecting parts Xa, each of which protrudes in a hemispherical shape, are formed on the adhering surface Sc of the pin head 43*a*. In this exemplary application, the connection pin 43 and the front-side link 40 correspond to the first member X1 and the second member X2, respectively. In the main seat S, as illustrated in FIG. 14, the plurality of projecting parts Xa are formed on the adhering surface Sc of the pin head 43*a* and positioned at both sides of the pin main body 43*b*. To give a more specific description, two projecting parts Xa are formed about 180 degrees apart from each other in a circumferential direction of the pin head 43*a*.

The adhering structure of the present invention is employed as the adhering structure between the connection pin 43 and the front-side link 40. To give a more specific description, the whole of each projecting portion Xa is held on the inner side of the outer edge of the pin head 43*a*. In addition, as illustrated in FIG. 14, an adhesive agent layer Gl that is formed by the adhesive agent interposed between the pin head 43*a* and the front-side link 40 makes contact with the outer circumferential surfaces of the projecting parts Xa while surrounding the projecting parts Xa.

To describe the front-side link 40, as described above, the carbon fibers contained in the CFRP between through-holes formed in the front-side link 40 are aligned with one another along a direction from one of the through-holes to another through-hole. To give a strict description, the front-side link 40 is formed such that a higher proportion of carbon fibers are aligned with one another along a direction from one of the through-holes to another through-hole. The combination between this configuration and the adhering structure of the present invention enables the adhering state of the connection pin 43 and the front-side link 40 to be maintained more firmly.

To give a more specific description, adjusting the alignment of the carbon fibers in the above manner suppresses the front-side link 40 from being deformed (in particular, deformed to expand) between the through-holes. This makes it possible to suppress the portions of the front-side link 40 which are abutted against the projecting parts Xa of the connection pin 43 from being displaced in conjunction with the deformation of the front-side link 40. Therefore, the location of each projecting portion Xa relative to the front-side link 40 is maintained. As a result, the adhering state of the connection pin 43 and the front-side link 40 is maintained more firmly.

The connection pin 43 is equipped with claw-shaped projections 43*c*, each of which protrudes from the adhering surface Sc of the pin head 43*a*. As illustrated in FIG. 14, each claw-shaped projection 43*c* protrudes from a region of the adhering surface Sc which is positioned between the pin main body 43*b* and each projecting portion Xa. In the main seat S, the two claw-shaped projections 43*c* are formed about 180 degrees apart from each other in a circumferential direction of the pin head 43*a*.

Figure 15:
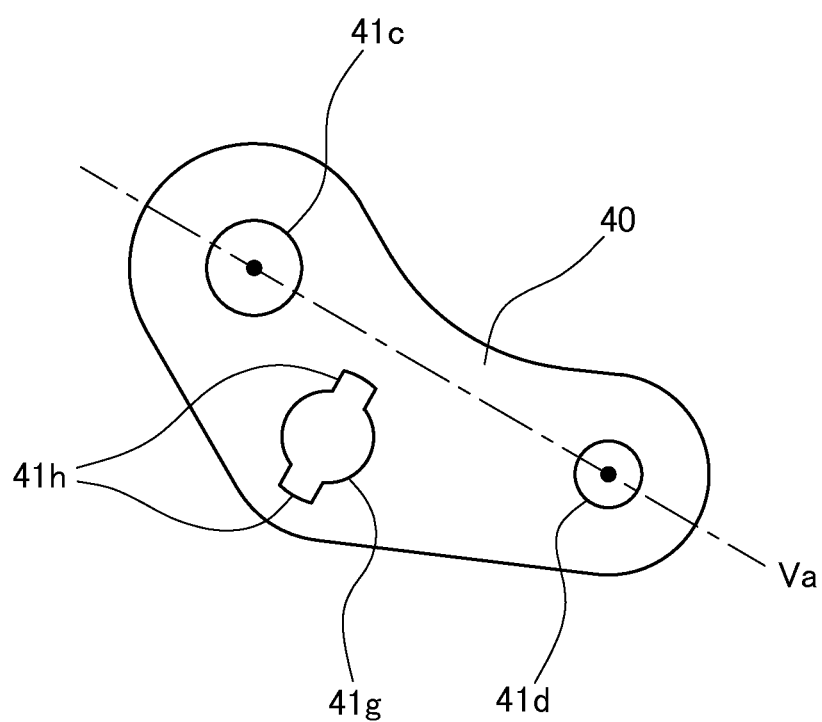
FIG. 15 is a diagram illustrating a positional relationship among a plurality of holes formed in the front-side link.

As illustrated in FIG. 15, cutout portions 41*h* are formed on the outer edge of the connection hole 41*g* in the front-side link 40, each cutout portion 41*h* being a rectangular notch. The cutout portions 41*h* are formed at two sites about 180 degrees apart from each other in a direction along the outer circumference of the connection hole 41*g*.

When the pin main body 43*b* of the connection pin 43 is inserted and fits into the connection hole 41*g* in order to attach the connection pin 43 to the front-side link 40, the above claw-shaped projections 43*c* are inserted into the corresponding cutout portions 41*h* and disposed therein. This can suppress the connection pin 43 from rotating relative to the front-side link 40 when the connection pin 43 is attached to the front-side link 40. Therefore, the claw-shaped projections 43*c* correspond to a rotation stopper provided in the connection pin 43 in order to suppress the connection pin 43 from rotating relative to the front-side link 40.

As described above, the cutout portions 41*h* that accommodate the above claw-shaped projections 43*c* are formed on the circumference of the connection hole 41*g* in the front-side link 40. To describe a relationship of the cutout portions 41*h* and the pin holes 41*c* and 41*d* in the front-side link 40, as illustrated in FIG. 15, the cutout portions 41*h* formed at two sites are formed so as not to traverse a virtual straight line Va that passes through the centers of the pin holes 41*c* and 41*d*. In this case, if the cutout portions 41*h* are formed in the front-side link 40, the stiffness of the front-side link 40 is still ensured.

To give a more specific description, in a configuration in which the pin holes 41*c* and 41*d* are formed at both ends of the front-side link 40, it is important to ensure the stiffness of the region between the pin holes 41*c* and 41*d*. For this reason, when the cutout portions 41 h traverse the region between the pin holes 41*c* and 41*d*, or in particular the above virtual straight line Va, it is difficult to ensure the stiffness of the region between the pin holes 41*c* and 41*d*. In the main seat S, however, neither of the cutout portions 41*h* traverses the above virtual straight line Va, in which case stiffness of the region between the pin holes 41*c* and 41*d* is ensured appropriately.

Third Example

The adhering structure according to an embodiment is applied to the main seat S in order to fix the above connection brackets 11 to the respective side-portion frames 6 in the seat cushion frame 2 and to the respective casings 10*a* in the reclining units 10. In the main seat S, actually, the connection brackets 11 are bonded to the side-portion frames 6 and the casings 10*a* with an adhesive agent, and the adhering structure according to an embodiment is employed as this adhering structure.

Figure 16:
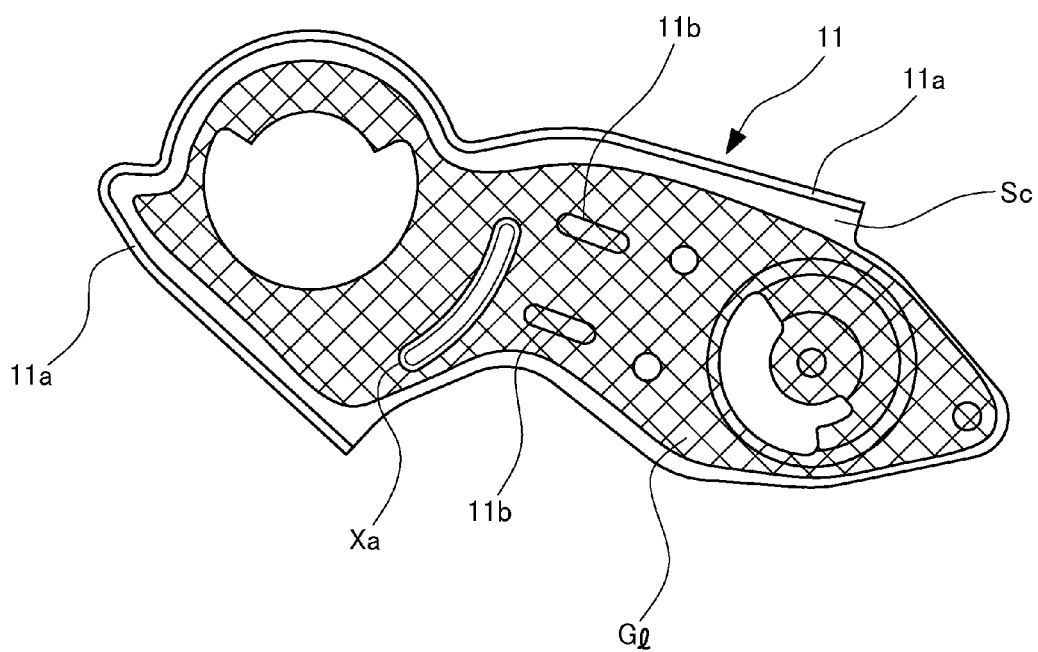
FIG. 16 is a diagram of a connection bracket as seen from the rear surface side.

As illustrated in FIG. 16, a connection bracket 11 is equipped with a flange 11a formed by bending an upper end of the connection bracket 11 inward in the width direction. Of this flange 11a, the front-side portion extends along the upper edge of the side-portion frame 6 at the rear end and the rear-side portion extends along the upper edge of the casing 10a in the reclining unit 10. When the seatback frame 1 is connected to the seat cushion frame 2 by the connection bracket 11, this connection bracket 11 is positioned such that the flange 11a is hooked on both the upper edge of the rear end of the side-portion frame 6 and the upper edge of the casing 10a. This position corresponds to the attachment position of the connection bracket 11.

Figure 17:
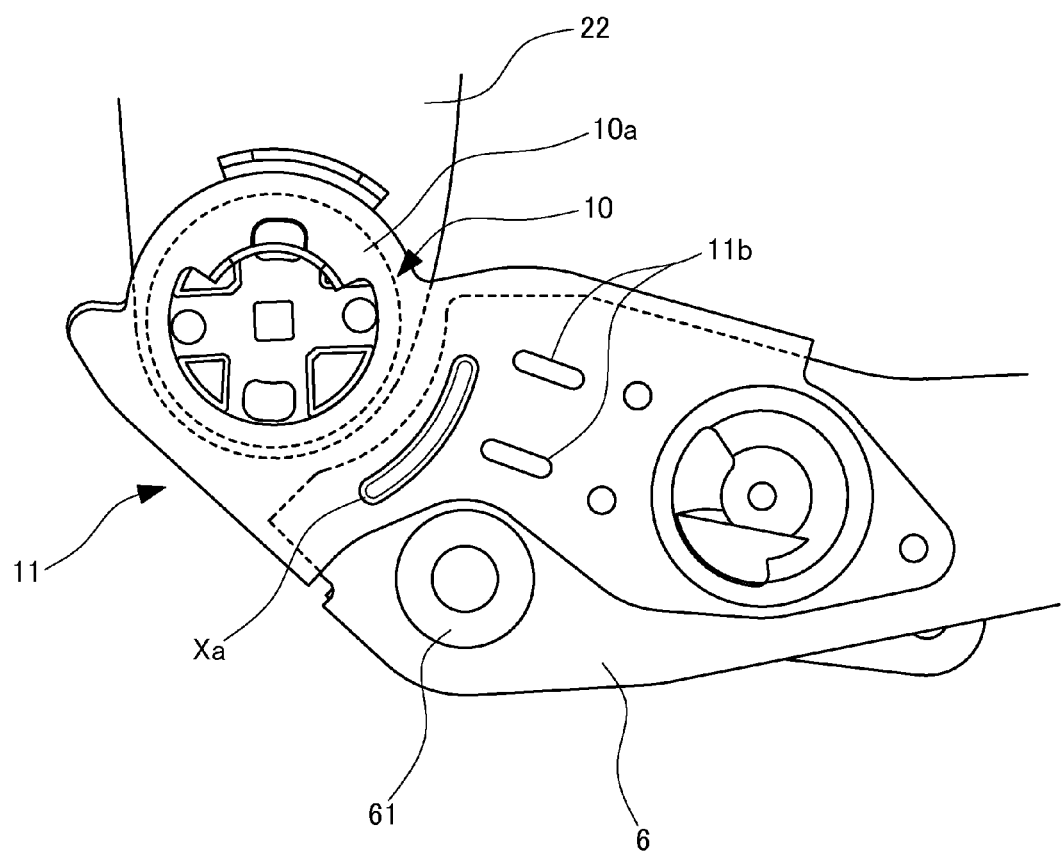
FIG. 17 is an explanatory diagram of an adhering structure between the connection bracket and a member bonded to the connection bracket.

When the connection bracket 11 is disposed in the above attachment position, the lower edge of the connection bracket 11 is positioned over the frame rear-side shaft pin 61 attached to the lower portion of the side-portion frame 6 at the rear end, as illustrated in FIG. 17. In other words, the lower edge of the connection bracket 11 is partially cut out in a substantially triangle shape so that when the connection bracket 11 is attached to the side-portion frame 6, the lower edge of the connection bracket 11 does not cover the attachment position of the frame rear-side shaft pin 61. Consequently, when the frame rear-side shaft pin 61 is attached to the side-portion frame 6, it is not interfered with by the connection bracket 11, so it can be attached smoothly to the frame rear-side shaft pin 61.

When the connection bracket 11 is disposed at the above attachment position, the inner surface of the connection bracket 11 in the width direction (the inner side surface of the connection bracket 11) faces both the side-portion frame 6 and the casing 10a. Specifically, the inner side surface of the connection bracket 11 is bonded to both the side-portion frame 6 and the casing 10a. This means that the connection bracket 11 is provided with the inner side surface as the adhering surface Sc.

As illustrated in FIG. 16, a projecting portion Xa is formed on the adhering surface Sc of the connection bracket 11, the projecting portion Xa being formed of a bead portion curved in an arched shape. When the connection bracket is bonded to both the side-portion frame 6 and the casing 10a, the projecting portion Xa is abutted against the outer side surface of the side-portion frame 6 at the rear end. In this exemplary application, accordingly, the connection bracket 11 and the side-portion frame 6 correspond to the first member X1 and the second member X2, respectively.

The adhering structure of the present invention is applied to the adhering structure between the connection bracket 11 and the side-portion frame 6. To give a more specific description, the entire projecting portion Xa is held on the inner side of the outer edge of the connection bracket 11. In addition, as illustrated in FIG. 16, the adhesive agent layer Gl that is formed of the adhesive agent interposed between the connection bracket 11 and the side-portion frame 6 makes contact with the outer circumferential surface of the projecting portion Xa while surrounding the projecting portion Xa.

The adhering structure is applied to the main seat S when the connection bracket 11 adheres to the side-portion frame 6, but it can also be used when the connection bracket 11 adheres to the casing 10a in the reclining unit 10. In other words, if the connection bracket 11 is the first member X1, at least one member of the side-portion frame 6 in the seat cushion frame 2 and the casing 10a in the reclining unit 10 may be the second member X2. Furthermore, the projecting portion Xa may be any given portion that projects toward the at least one member.

When the seatback frame 1 is connected to the seat cushion frame 2 by the connection bracket 11, the projecting portion Xa formed on the inner side surface of the connection bracket 11 is disposed close to the casing 10a in the reclining unit 10. In this way, the projecting portion Xa protrudes toward the side-portion frame 6 of the seat cushion frame 2. In the main seat S, the projecting portion Xa is a bead portion that protrudes in an arched shape along the outer side of the circular casing 10a. As described above, the formation of the bead along the outer side of the casing 10a as the projecting portion Xa can suppress effectively the deformation of the adhesive agent in proportion to the extension length of the bead portion. Consequently, it is possible to further improve the adhesive strength between the connection bracket 11 and the side-portion frame 6.

As illustrated in FIG. 17, when the seatback frame 1 is connected to the seat cushion frame 2 by the connection bracket 11, the projecting portion Xa is positioned slightly forward of the rear edge of the side-portion frame 6 in the front to back direction. Moreover, the rear side of the side-portion frame 6 is also formed in an arched shape along the outer side of the casing 10a. Accordingly, the bead portion formed in the connection bracket 11 as the projecting portion Xa is formed along the rear end of the side-portion frame 6.

The adhesive agent is coated on a substantially entire area of the inner side surface, or the adhering surface Sc, of the connection bracket 11 which faces the side-portion frame 6. In other words, the adhesive agent layer Gl is formed in an entire space sandwiched by the side-portion frame 6 and a portion of the connection bracket 11 which faces the side-portion frame 6.

As illustrated in FIGS. 16 and 17, elongated holes 11b are formed within the region of the connection bracket 11 which faces the side-portion frame 6 with the adhesive agent layer Gl therebetween, each elongated hole 11b extending in a direction that intersects the bead portion as the projecting portion Xa. In the main seat S, two elongated holes 11b are formed at different locations in the upward to downward direction. Note that the number of elongated holes 11b can be set to an arbitrary number.

Parts of the adhesive agent layer Gl stick out from the respective elongated holes 11b. Then, the adhesive agent layer Gl that has stuck out from the elongated holes 11b goes round from the outer edge of each elongated hole 11b to the inner side thereof in the width direction and is cured. As described above, the connection bracket 11 adheres to the side-portion frame 6 through the inner side surface, or the adhering surface Sc. In this case, since the adhesive agent that has stuck out from the elongated holes 11b and gone round from the outer edge of each elongated hole 11b to the inner side thereof in the width direction is cured, the connection bracket 11 adheres to the side-portion frame 6 more firmly.

The longitudinal direction in which each elongated hole 11b extends crosses the bead portion, or the projecting portion Xa. By crossing this longitudinal direction of each elongated hole 11b over the bead portion or the projecting portion Xa in this way, the adhering state of the connection bracket 11 and the side-portion frame 6 can be stabilized even when a load perpendicular to the bead portion acts.

To give a more specific description, suppose only the bead portion which is the projecting portion Xa is formed on the connection bracket 11. When a load perpendicular to the bead portion is input to the connection bracket 11, the connection bracket 11 may be separated easily from the side-portion frame 6. In contrast, suppose the elongated holes 11b are formed to cross the bead portion, and the connection bracket 11 adheres to the side-portion frame 6 with the adhesive agent that has moved round from the outer edge of each elongated hole 11b to the inner side thereof in the width direction. When a load acts on the connection bracket 11 in a direction perpendicular to the bead portion, the adhering strength can be ensured sufficiently. Therefore, it is possible to maintain a stable state where the connection bracket 11 adheres to the side-portion frame 6.

TABLE OF REFERENCE NUMERALS

S main seat
Sh seat main body
S1 seatback
S2 seat cushion
S3 headrest
F seat frame
X1 first member
X2 second member
Sc adhering surface
Sd non-adhering surface
Xa projecting portion
Gl adhesive agent layer
Vs1 first virtual plane
Vs2 second virtual plane
Va virtual straight line
1 seatback frame
2 seat cushion frame
4 slide rail mechanism,
4a movable rail
4b link support projection
4d link support projection
5 height adjustment mechanism
6 side frame
10 reclining unit
10a casing
11 connection bracket
11a flange
11b elongated hole
22 side frame
25 pinion gear
30 rear-side link
31 sector gear
34c, 34d pin hole
35 connection pipe
36 joint member
36a cylindrical portion
36b base portion
36c fitting projection
36d convex portion
36e arc-shaped curved surface region, second region
36f flat surface region, first region
40 front-side link
41c, 41d pin hole
41g connection hole
41h cutout portion
42 connection pipe
43 connection pin
43a pin head
43b pin main body
43c claw-shaped projection
61 frame rear-side shaft pin
62 rail rear-side shaft pin
65 frame front-side shaft pin
66 rail front-side shaft pin
72 metal bushing

The invention claimed is:

1. A vehicle seat comprising:
a first member;
a second member bonded to the first member with an adhesive agent;
a seat main body on which an occupant is to sit;
link members provided on both sides of the vehicle seat in a width direction of the vehicle seat, the link members supporting the seat main body in such a way that the seat main body can move vertically relative to the base member positioned under the seat main body;
a pipe member disposed between the link members in the width direction; and
a connection member connecting the link members to the pipe member;
wherein:
a first projecting portion that protrudes from an adhering surface of the first member toward the second member is formed with a first end to a second end in a protruding direction of the first projecting portion held on an inner side of an outer edge of the adhering surface;
an adhesive agent layer formed of the adhesive agent interposed between the first member and the second member makes contact with an outer circumferential surface of the first projecting portion while surrounding the first projecting portion;
if the first member is the connection member and the second member is the link member, the first projecting portion is integrally molded with the connection member;
the connection member includes:
a base portion provided with the adhering surface as one side surface, and
a rotation stopper that is adapted to mate with an engaged portion formed in the pipe member when the connection member is inserted into the pipe member, thereby suppressing the connection member from rotating relative to the pipe member;
the rotation stopper is formed on a non-adhering surface of the base portion which is positioned on an opposite side to the adhering surface, and
in the base portion, a region in which the rotation stopper is provided on the non-adhering surface is different from a region in which the first projecting portion is provided on the adhering surface.

2. The vehicle seat according to claim 1, wherein:
the first projecting portion comprises a plurality of projecting parts provided on the adhering surface,
the first member has a second projecting portion that protrudes from a portion of the adhering surface sandwiched between the plurality of projecting parts, and
the second member has a fitting hole into which the second projecting portion fits.

3. The vehicle seat according to claim 2, wherein:
the second projecting portion is formed to be symmetric with respect to both a first virtual plane and a second virtual plane, the first virtual plane being perpendicular to the adhering surface, the second virtual plane being perpendicular to both the adhering surface and the first virtual plane, and
each of the plurality of projecting parts is formed at a position opposite to a first region on the outer circumferential surface of the second projecting portion, the first region being different from a second region that is farthest from a line of intersection of the first virtual plane and the second virtual plane.

4. The vehicle seat according to claim 1, wherein the first projecting portion is a bead portion formed into a curved shape as seen from the protruding direction.

5. A vehicle seat, comprising:
- a first member;
- a second member bonded to the first member with an adhesive agent;
- a seat main body on which an occupant is to sit;
- link members provided on both sides of the vehicle seat in a width direction of the vehicle seat, the link members supporting the seat main body in such a way that the seat main body can move vertically relative to the base member positioned under the seat main body;
- a pipe member disposed between the link members in the width direction; and
- a connection member connecting the link members to the pipe member;

wherein:
- a first projecting portion that protrudes from an adhering surface of the first member toward the second member is formed with one end to an other end in a protruding direction of the first projecting portion held on an inner side of an outer edge of the adhering surface;
- an adhesive agent layer formed of the adhesive agent interposed between the first member and the second member makes contact with an outer circumferential surface of the first projecting portion while surrounding the first projecting portion;
- if the first member is the connection member and the second member is the link member, the first projecting portion is integrally molded with the connection member;
- a through-hole is provided in each link member;
- the connection member has a fitting projection protruding from a portion of the adhering surface which is different from a portion in which the first projecting portion is provided, the fitting projection fitting into the through-hole;
- a region of at least a portion of the outer circumferential surface of the fitting projection is formed into a flat surface;
- a cutout portion is provided at an outer edge of the through-hole;
- the connection member has a rotation stopper disposed within the cutout portion when the fitting projection fits into the through-hole, the rotation stopper suppressing the connection member from rotating relative to the link member;
- a first fastening hole that takes the shape of a circular hole is provided at an end of the link member, the first fastening hole being formed to secure the link member to the seat main body;
- a second fastening hole that takes the shape of a circular hole is provided at the other end of the link member, the second fastening hole being formed to secure the link member to the base member; and
- the cutout portion is provided to not traverse a virtual straight line, the virtual straight line passing through both centers of the first fastening hole and the second fastening hole.

6. The vehicle seat according to claim 5, wherein:
- the first projecting portion comprises a plurality of projecting parts provided on the adhering surface,
- the first member has a second projecting portion that protrudes from a portion of the adhering surface sandwiched between the plurality of projecting parts, and
- the second member has a fitting hole into which the second projecting portion fits.

7. The vehicle seat according to claim 6, wherein:
- the second projecting portion is formed to be symmetric with respect to both a first virtual plane and a second virtual plane, the first virtual plane being perpendicular to the adhering surface, the second virtual plane being perpendicular to both the adhering surface and the first virtual plane, and
- each of the plurality of projecting parts is formed at a position opposite to a first region on the outer circumferential surface of the second projecting portion, the first region being a different region than a second region that is farthest from a line of intersection of the first virtual plane and the second virtual plane.

* * * * *